US011223596B2

(12) United States Patent
Klucznik et al.

(10) Patent No.: US 11,223,596 B2
(45) Date of Patent: Jan. 11, 2022

(54) GENERATION OF COMPOSITE MESSAGES USING QUALIFYING EVENTS AND ACTIONS

(71) Applicant: StubHub, Inc., San Francisco, CA (US)

(72) Inventors: Torey Glenn Klucznik, San Francisco, CA (US); Eric Robert Anderson, Santa Rosa, CA (US); Christopher Camillo Lanzafame, Sacramento, CA (US)

(73) Assignee: StubHub, Inc., San Francisco, CA (US)

( * ) Notice: Subject to any disclaimer, the term of this patent is extended or adjusted under 35 U.S.C. 154(b) by 146 days.

(21) Appl. No.: 16/409,752

(22) Filed: May 10, 2019

(65) Prior Publication Data
US 2020/0162414 A1  May 21, 2020

Related U.S. Application Data

(60) Provisional application No. 62/769,524, filed on Nov. 19, 2018.

(51) Int. Cl.
*H04L 12/58* (2006.01)
*G06F 16/9536* (2019.01)
(Continued)

(52) U.S. Cl.
CPC .......... *H04L 51/36* (2013.01); *G06F 16/9535* (2019.01); *G06F 16/9536* (2019.01); *H04L 67/22* (2013.01)

(58) Field of Classification Search
CPC ..... H04L 51/36; H04L 67/22; G06F 16/9535; G06F 16/9536
(Continued)

(56) References Cited

U.S. PATENT DOCUMENTS 5,408,417 A * 4/1995 Wilder ................... G06Q 10/02
  235/381
6,076,068 A * 6/2000 DeLapa ............... G06Q 20/387
  186/52
(Continued)

FOREIGN PATENT DOCUMENTS

JP   2016042384 A   3/2016
KR   10-2016-0118644 A   10/2016
(Continued)

OTHER PUBLICATIONS

International Search Report and Written Opinion, as issued in connection with International Patent Application No. PCT/US2019/041996, dated Dec. 20, 2019, 4 pgs.
(Continued)

*Primary Examiner* — Uzma Alam
*Assistant Examiner* — Sahera Halim
(74) *Attorney, Agent, or Firm* — McDermott Will & Emery LLP

(57) ABSTRACT

Technologies are provided for generation of composite messages using qualifying events corresponding to respective ticketed performances and qualifying actions of a subscriber of a service platform. By analyzing qualifying events and qualifying actions jointly, the disclosed technologies supply a number of contextually-relevant individual messages collected in a composite message that is delivered to the subscriber periodically. The individual messages describe ticketed performances that are relevant to the subscriber. The composite message also provides reasons for the inclusion of the individual messages in the composite message. The individual messages can be arranged within the composite message according to a layout based on a ranking of priority scores. Each priority score conveys a level of relevancy of a ticketed performance with respect to a subscriber. The provided technologies, therefore, supply a
(Continued)

composite message that can match the subscriber to personalized ticketed performances while reducing the number of messages received by the subscriber.

20 Claims, 9 Drawing Sheets

(51) Int. Cl.
  *G06F 16/9535* (2019.01)
  *H04L 29/08* (2006.01)
(58) Field of Classification Search
  USPC .......................................................... 709/206
  See application file for complete search history.

(56) References Cited

U.S. PATENT DOCUMENTS

| | | | | |
|---|---|---|---|---|
| 6,119,014 | A * | 9/2000 | Alperovich | H04L 51/38 |
| | | | | 455/466 |
| 8,510,136 | B2 * | 8/2013 | Charania | G06Q 10/02 |
| | | | | 705/5 |
| 8,732,195 | B2 * | 5/2014 | Skeen | G06F 16/686 |
| | | | | 707/769 |
| 9,349,108 | B2 * | 5/2016 | Skeen | H04N 21/252 |
| 9,607,316 | B2 | 3/2017 | Mirchandani et al. | |
| 10,304,110 | B2 * | 5/2019 | Athimoolam | G06F 16/9566 |
| 10,628,760 | B2 * | 4/2020 | Skeen | G06Q 20/045 |
| 2006/0015404 | A1 * | 1/2006 | Tran | G06Q 30/00 |
| | | | | 705/14.25 |
| 2007/0043593 | A1 * | 2/2007 | Provost | G06Q 30/04 |
| | | | | 705/2 |
| 2007/0156443 | A1 * | 7/2007 | Gurvey | G06Q 10/02 |
| | | | | 705/64 |
| 2007/0180038 | A1 * | 8/2007 | Lee | H04L 12/189 |
| | | | | 709/206 |
| 2009/0150498 | A1 * | 6/2009 | Branda | G06Q 10/107 |
| | | | | 709/206 |
| 2010/0082374 | A1 * | 4/2010 | Charania | G06Q 30/0601 |
| | | | | 705/5 |
| 2011/0054981 | A1 * | 3/2011 | Faith | G06Q 30/0269 |
| | | | | 705/7.36 |
| 2011/0060794 | A1 | 3/2011 | Sweeney | |
| 2012/0124146 | A1 * | 5/2012 | Hsiao | H04L 51/36 |
| | | | | 709/206 |
| 2012/0323612 | A1 | 12/2012 | Callaghan | |
| 2012/0323933 | A1 * | 12/2012 | He | H04L 51/24 |
| | | | | 707/749 |
| 2013/0096961 | A1 * | 4/2013 | Owens | G06Q 10/02 |
| | | | | 705/5 |
| 2013/0117107 | A1 | 5/2013 | Evans | |
| 2013/0339877 | A1 * | 12/2013 | Skeen | G06F 16/639 |
| | | | | 715/753 |
| 2014/0279190 | A1 | 9/2014 | Severinghaus et al. | |
| 2014/0310066 | A1 | 10/2014 | Etzioni et al. | |
| 2015/0100869 | A1 * | 4/2015 | Sunshine | G06F 3/0488 |
| | | | | 715/205 |
| 2015/0120767 | A1 * | 4/2015 | Skeen | G06F 16/639 |
| | | | | 707/754 |
| 2015/0127459 | A1 | 5/2015 | Mesaros | |
| 2015/0143406 | A1 * | 5/2015 | Cho | H04N 21/431 |
| | | | | 725/32 |
| 2015/0186973 | A1 * | 7/2015 | Athimoolam | G06Q 30/0625 |
| | | | | 705/26.62 |
| 2015/0199736 | A1 * | 7/2015 | Chang | G06Q 30/0601 |
| | | | | 705/26.1 |
| 2015/0213024 | A1 * | 7/2015 | Frankel | H04L 12/1895 |
| | | | | 707/758 |
| 2015/0242916 | A1 * | 8/2015 | Godsey | G06Q 30/0613 |
| | | | | 705/5 |
| 2015/0271282 | A1 | 9/2015 | Deo et al. | |
| 2016/0071116 | A1 | 3/2016 | Atkins et al. | |
| 2016/0321568 | A1 * | 11/2016 | Gosuin | H04L 51/36 |
| 2016/0330158 | A1 * | 11/2016 | Gonzales | H04L 51/16 |
| 2017/0063946 | A1 * | 3/2017 | Quan | H04L 67/20 |
| 2017/0102855 | A1 * | 4/2017 | Kwon | G06F 1/163 |
| 2017/0185596 | A1 | 6/2017 | Spirer | |
| 2017/0353410 | A1 * | 12/2017 | Gonzales | H04L 51/22 |
| 2018/0032997 | A1 * | 2/2018 | Gordon | G06Q 30/0269 |
| 2018/0047284 | A1 * | 2/2018 | Narasimha | G08G 1/092 |
| 2018/0048595 | A1 * | 2/2018 | Dotan-Cohen | H04L 51/08 |
| 2018/0270183 | A1 * | 9/2018 | Wei | H04L 51/26 |
| 2019/0012612 | A1 * | 1/2019 | Skeen | G06Q 20/102 |
| 2019/0066001 | A1 * | 2/2019 | Hunt | G06Q 20/105 |

FOREIGN PATENT DOCUMENTS

| | | | | |
|---|---|---|---|---|
| WO | 2001/011507 A1 | 2/2001 | | |
| WO | 2001022750 A1 | 3/2001 | | |
| WO | WO-2004019603 A1 * | 3/2004 | | H04N 1/32368 |
| WO | 2009007410 A2 | 1/2009 | | |
| WO | 2014000131 A1 | 1/2014 | | |
| WO | WO-2015092552 A2 * | 6/2015 | | G06Q 10/02 |

OTHER PUBLICATIONS

Gunelius, "Secrets to Setting Event Ticket Prices to Maximize Sales," In: AttendStar, Apr. 13, 2017, retrieved on Aug. 28, 2019 from <https://www.attendstar.com/secrets-setting-event-ticket-prices-maximize-sales/>, entire document, 5 pgs.
WIPO of IB, International Preliminary Report on Patentability for related PCT/US2019/041966 dated Jun. 3, 2021, 9 pgs.

* cited by examiner

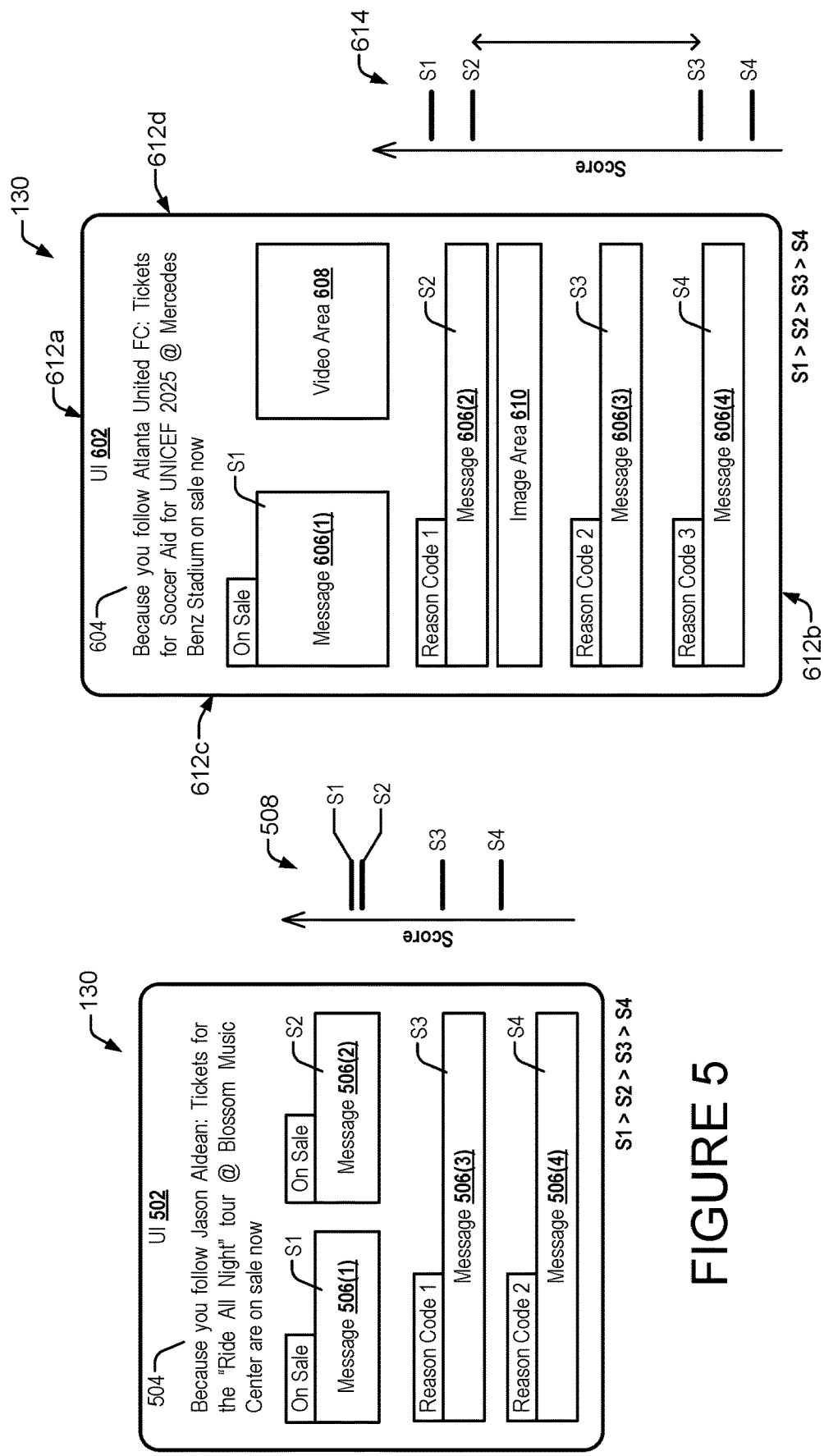

GENERATION OF COMPOSITE MESSAGES USING QUALIFYING EVENTS AND ACTIONS

PRIORITY APPLICATION

This application claims the benefit of and priority to U.S. Provisional Application No. 62/769,524, filed Nov. 19, 2018, the entire contents of which are hereby incorporated herein by reference.

BACKGROUND

Some existing systems routinely send messages to provide notifications of available opportunities to purchase products. Such systems can send messages based on historical behaviors of users. For example, a system may send messages notifying a user of airfares to a specific destination, discounted car rentals, hotel discounts, etc.

The process for identifying and selecting relevant messages can be difficult and inefficient with respect to computing resources. Typically, individual messages are sent to users for each item that may be of interest. Such techniques can be inefficient with respect to computing resources and network resources. For instance, messages directed to discounted airfare can be sent in one batch of messages and other messages directed to discounted car rentals can be sent in another batch of messages. Although this technique can be useful for communicating special discounts and promotions, existing systems can produce a number of drawbacks given the volumes of information that can be sent. In some instances, users can receive a high volume of messages that are often ignored. This ultimately leads to a scenario where a number of computing resources are utilized with very little benefit.

It is with respect to these and other technical challenges that the disclosure made herein is presented.

SUMMARY

The technologies disclosed herein improve the efficiency and effectiveness of existing systems by enabling the generation of composite messages from individual messages using qualifying events corresponding to ticketed performances and qualifying actions of a subscriber of a ticketing platform. A qualifying event can include a threshold level of change in at least one parameter, such as a price or availability, of a ticketed performance. A qualifying action of a subscriber can be determined from any type of user activity, such as the purchase history or browsing history of a user. By analyzing qualifying events and qualifying actions to combine individual messages to generate a composite message, a system can deliver a number of contextually-relevant individual messages to a user while reducing the use of computing resources. A composite message of individual messages can describe upcoming ticketed performances that are relevant to the subscriber. In addition, the composite message can provide reasons for the inclusion of the individual messages in the composite message.

The disclosed technologies address the above-described technical shortcomings of conventional technologies by analyzing qualifying events and qualifying actions jointly in order to provide a number of contextually-relevant individual messages assembled into a composite message that is delivered to the subscriber. The individual messages within the composite message can convey, for example, information about respective ticketed performances that are relevant to the subscriber and also provide reasons for the inclusion of the individual messages in the composite message. The provided technologies, therefore, supply composite messages that can match respective subscribers to personalized ticketed performances while reducing the number of messages received by subscribers. This can increase the efficacy of the messages sent to the subscriber and improve the computing performance of the ticketing platform by, for example, reducing the amount of processing power utilized to generate messages and the network bandwidth involved in the transmission of the messages to a communication address of a subscriber account. Other technical benefits also can be attained through the implementation of the disclosed technologies.

To provide the technical improvements described herein, the technologies of this disclosure can prioritize and arrange a number of individual messages to a subscriber describing upcoming individual ticketed performances to generate composite messages. Rather than making a rule-based decision regarding which messages are to be sent, the disclosed technologies provide automated mechanisms that can select a number of contextually-relevant messages describing upcoming performances to generate a composite message to deliver to the subscriber. In some configurations, the composite messages also can describe the event, e.g., a price drop of a ticket, a sales event, or a promotion, that led to the inclusion of individual messages in a composite message.

More specifically, some embodiments include components that form an "event qualification layer" that can categorize ticketed performance data based on multiple "event model reasons" (e.g., "Good Deal Sports," "Good Deal Concerts," "Good Deal Theater," "Price Drop," and "Hot Performance"). Such categorizations can yield qualifying events corresponding to respective ticketed performances. The event qualification layer also can categorize subscriber accounts according to qualifying user actions. For a user account, the event qualification layer can analyze qualifying events and qualifying actions jointly in order to assemble multiple individual electronic messages into a composite message. For instance, assembling multiple individual electronic messages as is described herein can permit the formation of tens of thousands of unique hypertext markup language (HTML) emails unique for each recipient subscriber over a database of millions of recipients.

The individual electronic messages within a composite message can be prioritized for delivery based on combinations of actions and event model reasons to produce a unified interface personalized to a recipient. The individual messages can be arranged in relative order within the unified interface according to their overall relevance to the recipient. Composite messages can be composed as email messages or text messages according to various formats, e.g., HMTL email messages, short message service (SMS) format, multimedia messaging service (MMS) messages, messenger messages, iMessage messages, and the like. Regardless of the format, composite messages are configured to cause a user device to subsequently present a unified interface to the recipient in response to presentation of the composite message.

Composite messages also can include a reason that explains to a recipient the output of the event qualification layer—e.g., "Because you follow the Celtics: Hawks and Celtics 33% below 90 day moving average;" "Because you browsed the event: Jay-Z at Oracle tickets dropped 20% in last 24 hours." Accordingly, embodiments of the disclosure can contextualize the reasons the composite message is being delivered.

The disclosed technologies can facilitate the management of large audiences, conveying both knowledge of the recipient (in terms of online behavior, for example) and knowledge of a digital marketplace in terms of events related to ticketed performances or other types of items commercialized in the digital marketplace. In contrast to conventional technologies, by blending qualifying events and qualifying actions, the disclosed technologies can dramatically reduce the likelihood of a recipient subscriber discarding messages designed to be contextually relevant.

The principles and practical elements of this disclosure can be applied to message delivery platforms that can send different types of contextually-relevant messages to millions of potential subscriber recipients, based on several different factors or reasons. For instance, in the rideshare industry, an event qualification layer can identify a particular group of event model reasons to contact a driver device. For instance, such event model reasons can include a "Passenger At Pickup Location," "Trip Cancellation," "Rideshare Vehicle Disabled," "Passenger Delayed," and the like. Regardless of the specific definitions of event model reasons, the particular group of event model reasons in the rideshare industry can be defined to permit categorizing trip reservation data into pertinent events that can potentially result in a message being delivered to the driver device. For a particular industry, event model reasons can be coded into defined reason codes based on the industry domain (rideshare, travel, hospitality, gastronomy, etc.) in which the event qualification layer is applied. The synthesis process for the generation of composite messages based on the blending of event model reasons and actions can remain the same regardless of the industry domain.

The subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 5 illustrates an example of a composite message generated in accordance with aspects disclosed herein.

FIG. 6A illustrates another example of a composite message generated in accordance with aspects disclosed herein.

DETAILED DESCRIPTION

This Detailed Description is directed to technologies for generation of composite messages using qualifying events corresponding to ticketed performances in performance venues and qualifying actions of a subscriber to a ticketing platform. A qualifying event is a change in a ticketed performance within the ticketing platform, where the change satisfies a defined qualification criterion. In turn, a qualifying action can be an online activity of the subscriber that can be recorded in a user account of the subscriber. As mentioned, the disclosed technologies address various technical shortcomings of conventional technologies by analyzing qualifying events and qualifying actions jointly in order to provide a number of contextually-relevant individual messages collected in a composite message that is delivered to the subscriber periodically. The individual messages can convey, for example, the respective ticketed performances that are relevant to the subscriber and reasons for the inclusion of the individual messages in the composite message. The technologies are not limited to ticketed performances and, in some embodiments, the qualifying events and actions can be related to other types of items commercialized in a digital marketplace, such as car rental reservations, airplane ticket reservations, hotel room reservations, or the like.

In sharp contrast to conventional technologies that cause service platforms to send multiple, low-relevancy messages to subscriber accounts at various times, the disclosed technologies supply contextually-relevant composite messages that can match respective subscribers to personalized items while reducing the number of such messages received by a subscriber. As a result, the disclosed technologies can improve the computing performance of service platforms that routinely communicate with their subscribers by, for example, reducing the amount of processing power utilized to generate messages and the network bandwidth involved in the transmission of the messages to a communication address of a subscriber account.

Figure 1:
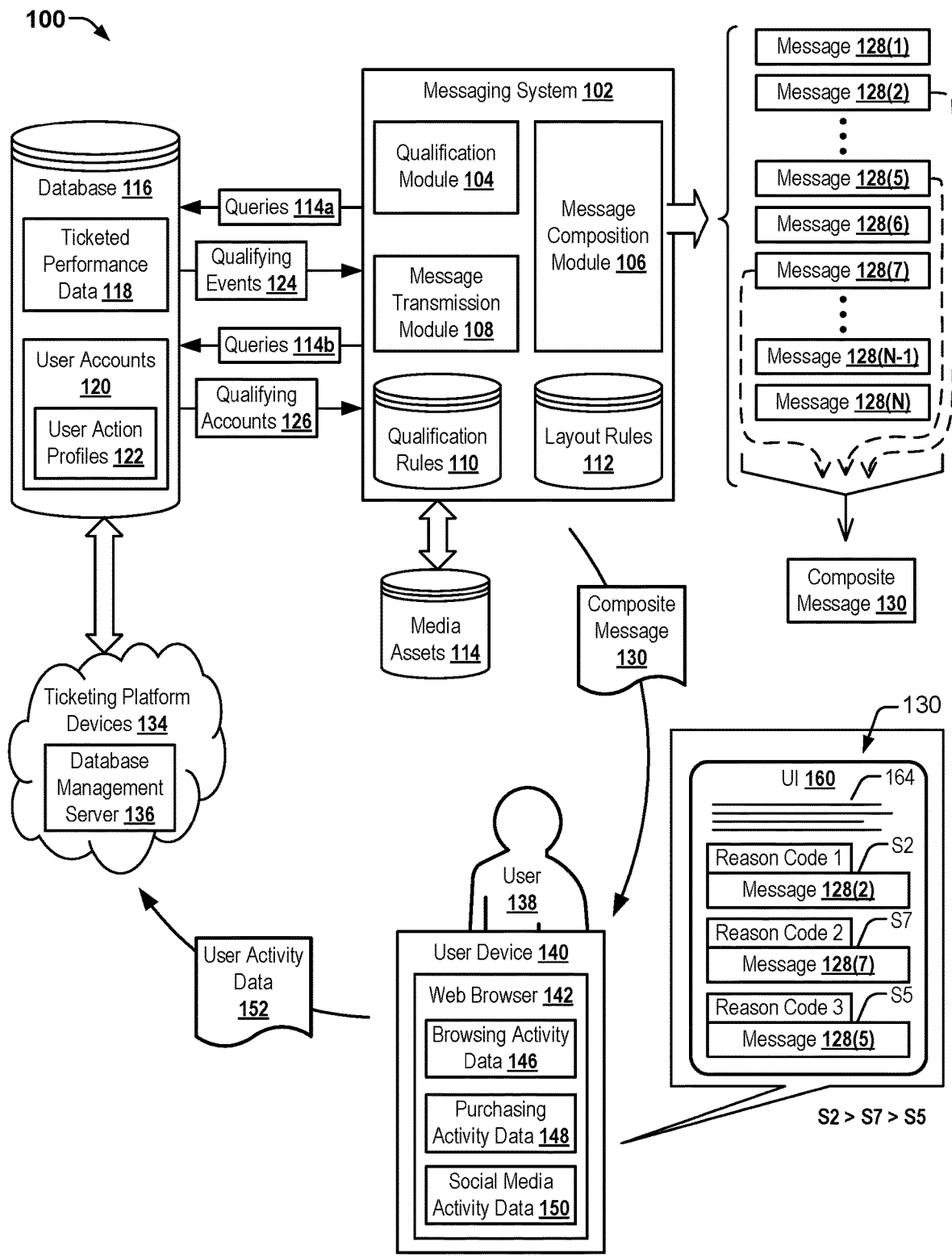
FIG. 1 illustrates an example of a computing architecture for generation of composite messages using qualifying events and qualifying actions, in accordance with one or more embodiments of this disclosure.

With reference to the drawings, FIG. 1 presents an example of a computing environment 100 that includes a computing system for generation of composite messages based on qualifying events and qualifying actions, in accordance with aspects of this disclosure. The computing system includes a messaging system 102 and a database 116. The message system 102 can access the database 116 to determine qualifying events and qualifying accounts having record of specific actions. The messaging system 102 can generate a composite message 130 using at least such events and accounts, and can send the composite message 130 to a communication address (an email address, a telephone number, etc.) of a user account of a user 138. The composite message 130 can be accessed and presented at a user device 140 by means of an email client application, a web browser application, or a mobile application executing in the user device 140.

More specifically, the database 116 includes ticketed performance data 118 and user accounts 120. The ticketed performance data 118 characterize specific upcoming performances that have respective tickets (or classes of tickets) attached to it. The ticketed performance data 118 can identify, among other things, a performer, a venue, and a ticket price. The ticketed performance data 118 also can be indicative of venue type, venue location, venue accessibility, seating chart for a venue, ticket availability, a combination thereof, or the like. The ticketed performance data 118 can be configured, in some embodiments, by a database management server device 136 included in ticketing platform devices 134 that constitute a ticketing platform. As mentioned, an event is a change in a ticketed performance within the ticketing platform, such as a change in ticket price, a change in ticket availability (e.g., tickets for the ticketed performance are on sale), and the like. More generally, an event corresponds to a change to an item that is commercialized in a digitized marketplace. Therefore, an event can constitute a reason to contact a recipient (e.g., a subscriber to the ticketing platform).

The user accounts 120 correspond to respective end-users of the ticketing platform, and can include respective user action profiles 122. A user action profile can include activity data indicative of one or many defined actions associated with a user account. The activity data can include, for example, activity records indicative of respective defined actions associated with the user account. Each one of the defined actions can represent, for example, a specific online behavior of a subscriber to the ticketing platform. The specific online behavior can be included in a group of predefined online behaviors. Such a group can include, for example, a "performance follow", a "performance like", a "performance browse", a "performer follow", a "performer purchase", a "performer browse", or a combination thereof. The group of predefined online behaviors can be configured, in some embodiments, by the database management server device 136.

To generate a user action profile corresponding to a user account, the database management service device 136 can receive user activity data 152 indicative of online behavior of a user 138 associated with the user account (e.g., the user account includes data identifying the user 138). In some embodiments, the user activity data 152 can be generated by means of a web browser 142 that can be executed in the user device 140 utilized by the user 138. In some instances, the user device 140 corresponds to the user account (e.g., the user account includes second data identifying the user device 140). In other instances, the user device 140 corresponds to a third-party, not the user 138, as it would be the case when the user device 140 belongs to a local library, an airport lounge, a relative of the user 138, or the like.

The user activity data 152 can include, for example, at least a portion of browsing activity data 146 indicative of webpages perused by the user 138 and/or online content (e.g., videos in a video channel) that the user 138 consumed. In some instances, some of the webpages and/or online content can result from one or more searches related to a particular ticketed performance, such as a concert by a renowned cellist, a soccer game involving the U.S. Women's National Soccer Team (USWNT), or the like. In other instances, some of the webpages and/or online content can result from one or more searches related to a particular artist, band, athlete, motivational speaker, or the like. In yet other instances, some of the webpages and/or online content result from direct navigation, without a search, to an online content channel or web site of a performer, sports team, social-media influences, video gamer, motivational speaker, or the like. Regardless of how the perused webpages and/or online content can be accessed, at least some of the browsing activity data 146 can represent "performance browse" actions, "performer browse" actions, or both.

In some instances, the user activity data 152 can include at least a portion of purchasing activity data 148 indicative of prior purchases of items from online retailers or other types of online outlets. Tickets for performances could have been purchased from the ticketing platform corresponding to the ticketing platform devices 134. For example, tickets for a performance by a particular artist, e.g., a concert by Jason Aldean or Kanye West, could have been purchased from the ticketing platform. As another example, tickets for a basketball game involving a star athlete, such as Lebron James, could have been purchased from the ticketing platform. As yet another example, tickets for a college football rivalry game involving The Ohio State University Buckeyes and the University of Michigan Wolverines could have been purchased from the ticketing platform. Thus, a portion of the purchasing activity data 150 can represent prior "performance purchase" actions, "performer purchase" actions, or both.

Further, or in other instances, the user activity data 152 can include at least a portion of a record of social media activity data 150 indicative of interaction with social media content that has been posted on a social media platform (not depicted in FIG. 1). The interaction can include, for example, consumption of the social media content; submission of comments on portions of the social media content; submission of feedback (such as a "reaction") to other portions of the social media content; or a combination thereof. Submission of feedback to particular social media content can include the submission of data that indicates that the content is liked by the user 138, for example.

An example of consumption of social media content includes the consumption of content from a defined social media account (a Twitter handle, a Facebook page, an Instagram account, etc.). The defined social media account can pertain, for example, to an artist (such as a comedian, a musician, or a singer), a band, an athlete, a sports team, a social-media influencer, or the like. In another example, the defined social media account can pertain to a scheduled ticketed performance of an artist or a scheduled sport performance (a football game, a soccer game, a boxing bout, etc.). A social media account of the user 138 can be linked to the defined social media account in order to receive social media content from it. Such linking can be referred to as "following" the defined social media account. Thus, at least some of the social media activity data 150 indicative of consumption of content from the defined social media account (e.g., a Facebook page of the band Poison or a Facebook page of a Lindsey Stirling tour) can represent "performer follow" actions, "performance follow" actions, "performance like" actions, or a combination thereof.

It is noted that the user activity data 152 is not limited to being generated by a web browser 142. At least a portion of the user activity data 152 can, in some embodiments, be generated by means of one or many applications that can be executed in the user device 140. Such applications (not depicted in FIG. 1) can include, for example, a web-browsing mobile client application, a mobile client application of a retailer, a social-media mobile client application, and the like.

The database management server device 136 can process the received user activity data 152 to identify one or more actions that correspond to the group of predefined online behaviors—e.g., a "performance follow", a "performance like", a "performance browse", a "performer follow", a "performer purchase", a "performer browse", "team follow", or a combination thereof. The database server device 136 can then record the identified action(s) in a user profile corresponding to a user account of the user 138. The user profile is retained in the user action profiles 122.

The messaging system 102 can categorize the ticketed performance data 118 according to "event model reasons" (or reason codes or defined factors) to communicate with a user account of the user 138. Examples of event model reasons include an "On Sale" code; a "Good Deal Sports" code; a "Good Deal Concerts" code; a "Good Deal Theater" code; a "Price Drop" code; a "Rivalry" code; a "Trend" code, and a "Hot Performance." Other reason codes are possible and can be defined. Indeed, any reason that permits categorizing an event within the ticketed performance data 118 can be coded as an event model reason. For example, another event model reason can be "sports star is in town."

To categorize the ticketed performance data 118 in such a fashion, the messaging system 102 can include a qualification module 104 that can form first queries 114*a* (e.g., SQL queries) representative of a subset of qualification rules 110. A qualification rule in such a subset establishes a criterion that an event model reason must satisfy in order for an event to be categorized as a qualifying event. For example, a first qualification rule of the qualification rules 110 can establish a threshold amount of price reduction for an event to qualify as a "Price Drop" event. As another example, a second qualification rule of the qualification rules 110 can establish a second threshold amount of price reduction relative to a historical average price (e.g., a three-month rolling average) for an event to qualify as a "Good Deal" event. Depending on the magnitude of the second threshold amount, for a long period (e.g., six months and over), a "Good Deal" event can be qualified as a "High Demand" event. As yet another example, a third qualification rule of the qualification rules 110 can establish a threshold amount of price increase relative to a historical average price for an event to qualify as a "Hot Performance" event. As still another example, a fourth qualification rule of the qualification rules 110 can establish the presence of an onset transition (e.g., a transition from an OFF state to an ON state) for an event to qualify as a "On Sale" event.

The messaging system 102 can probe the ticketed performance data 118 by sending the first queries 114*a* to the database 116. In response, the qualification module 104 can receive a response message that identifies a group of qualifying events 124. In some embodiments, the database management server 136 can receive the first queries 114*a*. Then, the database management server 136 can identify events within the ticketed performance data 118 that satisfy the qualification rules that form the first queries 114*a*. The database management server 136 can include any identified event(s) in the group of qualifying events 114, and can send the group to the message composition module 106. The identified event(s) can constitute the group of qualifying events.

It is noted that the disclosed technologies are not limited to identifying qualifying events by means of queries. In some embodiments, the qualification module 104 can receive data indicative of multiple events (such as new events). In one example, the database management server 136 can send the data to the messaging system 102. In response to receiving the data, the qualification module 104 can determine events that satisfy at least one qualification rule. Such events constitute qualifying events. For example, an event can be categorized as a qualifying event when a change in a ticketed performance identified by the event is such that the change satisfies a qualification rule. The change can include a change to a parameter of the ticketed performance. For illustrative purposes, a parameter of a ticketed performance can include a price of a ticket, a historical average of the price of the ticket, a venue, a time, a date, a seating position, a status of a reservation, or any other attribute of the ticketed performance.

In some instances, information of historical actions for the user 138 can be scarce. In such cases, qualifying events can be backfilled. While some user profiles can include historical action information (e.g., browsing history, purchase history, social media activity, other actions in a region, and the like), other user profiles may not include historical action or can have fewer actions. Those users can be backfilled with "good deals" in a region, for example. Backfill is some type of action that is surmised. For instance, a regional backfill of a user profile can be relied upon. Regional backfill can include model reasons, based on machine-learning techniques, for example, that are distinct from the user action profile of a customer. User profile can determine backfilled reasons, as opposed to a user action profile (where actual activities occurred). In some cases, genre preferences can be relied upon as a backfill before a regional backfill.

In addition, the messaging system 102 can categorize the user accounts 120 according to specific actions. To that end, the messaging system 102 can utilize a second subset of the qualification rules 110 to identify records of the specific user actions in at least some of the user action profiles 122. A qualification rule in the second subset of the qualification rules 110 specifies an action that must be included in a user action profile in order for a user account including the user action profile to be categorized as a qualifying account. The specified action is a qualifying action and can be included in the group of predefined online behaviors relied upon to generate the user action profiles 122. Accordingly, in some embodiments, the specified action can be one of a "performance follow", a "performance like", a "performance browse", a "performer follow", a "performer purchase", a "performer browse", or "team follow".

The qualification module 104 can form second queries 114*b* (e.g., SQL queries) representative of the second subset of qualification rules 110. In some embodiments, the database management server 136 can receive the second queries 114*b*. Using the second queries 114*b*, the database management server 136 can identify user action profiles within the user action profiles 122 that include a record of qualifying actions specified in the second queries 114b. The database management server 136 can incorporate information that identifies user accounts corresponding to the identified user action profiles into a response message (referred to as qualifying accounts 126). The database management server 136 can then send the response message 126 to the qualification module 104.

It is noted that the disclosed technologies are not limited to identifying qualifying accounts by means of queries. In some embodiments, the qualification module 104 can receive data indicative of user activity data for a user account, the user activity data indicative of a history of user activity related to one or more ticketed performances. For instance, the database management server 136 can send the user activity data to the messaging system 102. In response to receiving the user activity data, the qualification module 104 can determine user accounts that satisfy at least one qualification rule. Such user accounts constitute qualifying user accounts. For example, a user account can be categorized as a qualifying account when, for the user account, the user activity data identifies at least one defined user action related to one or more of ticketed performances.

The messaging system 102 includes a messaging composition module 106 that can generate the composite message 130. To that end, for a user account that is included in the qualifying accounts 126, the message composition module 106 can select first events included in the qualifying events identified by the response message 124. The first events can be selected by blending actions in a user action profile corresponding to the user account and event model reasons for the qualifying events. Therefore, not only are the first events personalized to a customer corresponding to the user account, but also are contextually linked to the customer through the user action profile. Depending on the size of the number of qualifying events, tens of thousands, maybe even hundreds of thousands, of first events may be selected in this fashion for the user account.

More specifically, to select a first event of the qualifying events identified by the response message 124 in such a fashion, the message composition module 106 can identify an event model reason for the first event, and can determine that an action in the user action profile is related to a ticketed performance corresponding to the first event. As an example, the event model reason can be "On Sale" and the ticketed performance can be a Jason Aldean concert included in the "Ride All Night" tour, at a specific venue. The action, in turn, can be a "performer follow" for Jason Aldean. As another example, the event model reason can be "Rivalry" and the ticketed performance can be a USWNT vs. Brazil soccer game at Mercedes Benz Stadium. The action, in that example, can be a "team follow" action for the USWNT.

Second events of the qualifying events identified by the response message 124 for which respective ticketed performances are not related to an action in the user action profile are not selected for the user account. For instance, an event corresponding to an "On Sale" reason code and a Lamar Kendrick concert may not be selected when the user action profile lacks any action related to such an artist or his music genre.

The messaging system 102, the qualification rules 110, the ticketed performance data 118, and the action profiles 122 can form an "event qualification layer." It is also noted that the event qualification layer can be applied to other event-reasons besides ticketed performances (or ticketed items) and fans. For example, in rideshare environments, a rideshare architecture may rely on other events/reasons to contact or otherwise message a driver device. Similarly, other actions may be relied upon and correlated to events. Reasons can have specific values based on the domain to which an event qualification layer is applied.

After a group of events from the qualifying events identified by the response message 124 is selected for a user account, the messaging composition module 106 also can compute and assign priority scores to events in the group of selected events. The priority scores can be specific to the user account, with another user account potentially having different priority scores for the group of events. A priority score S (a real number) can be determined, for example, using both the event model reason and the action corresponding to the selected first event. In some embodiments, the messaging composition module 106 can utilize a defined weighting scheme to compute the priority score based on an action-13 reason-code pair. Specifically, the messaging composition module 106 can assign a first numerical weight to the reason code and a second numerical weight to the action according to the defined weighting scheme. The first numerical weight can be referred to as a "reason weight" and the second numerical weight can be referred to as an "action weight." The priority score S can be determined by adding the first weight and the second weight.

In a weighting scheme, actions related to a purchasing activity can have greater action weights than actions related to a browsing activity or social media activity. For example, a "performer purchase" action can be assigned a greater action weight than a "performer browse" action or a "performer follow" action. Accordingly, for a particular reason code, purchase activity can yield greater priority scores than browsing activity or social media activity.

Different purchasing activity present in a user action profile also can result in different action weights for purchase actions. As an illustration, a number of past purchases of tickets for a particular type of ticketed performances can influence an action weight assigned to a particular action related to a qualifying event. A greater number of past purchases can result in a greater action weight and, thus, can yield a greater priority score.

Such type of influence is not limited to purchasing activity. For instance, different types of social media activity present in the user action profile also can yield different action weights. For a "performer follow" action related to a qualifying event, the action weight can be influenced by a number of other "performer follow" actions for performers in a same music genre, for example. A greater number of "performer follow" actions for related performers can result in a greater action weight and, thus, can yield a greater priority score.

Accordingly, in some instances, the priority score S can be determined using both the event model reason and a combination of the action corresponding to a qualifying event and other user activity data in a user profile. The messaging composition module 106 can assign different numerical weights to different types of user activity (purchasing activity, browsing activity, social media activity, and the like) to determine an action weight for the action. The messaging composition module 106 can the combine the action weight with a reason weight to determine the priority score S.

Reason codes can have different numerical weights based on different factors. For example, activity at a ticketing platform can influence a numerical weight assigned to a reason code. Such activity can include changes to parameters of ticketed events corresponding to qualifying events associated with the reason code. For instance, "Price Drop" events can correspond to ticketed performances having different magnitudes of a change in ticket price. Thus, in a weighting scheme, a numerical weight for a reason code can be based on a magnitude of a change to a parameter of a ticketed performance related to a qualifying event. A qualifying "Price Drop" event that corresponds to a larger reduction in ticket price can be assigned a greater numerical weight than another qualifying "Price Drop" corresponding to a lesser reduction in ticket price. Similarly, a qualifying "Hot Performance" event that corresponds to a larger increase in historical average price of a ticket can be assigned a greater numerical weight than another qualifying "Hot Event" corresponding to a lesser increase in historical average price of a ticket.

Other parameters besides ticket price or historical average ticket price also can influence numerical weights assigned to qualifying events for a reason code. For example, such parameters can include a level of uniqueness of a ticketed performance. The level of uniqueness can be in some instances a binary parameter (e.g., the ticketed performance is unique or is not unique). The level of uniqueness can be determined by the ticketing platform at a time tickets for the ticketed performance become available. The ticketed platform also can determine a level of uniqueness based on a response (in social media, for example) from potential ticket buyers. A ticketed performance that begins to trend in social media can be deemed to be unique, whereas another ticketed performance that does not trend can be deemed to be not unique. Ultimately, the greater the level of uniqueness of a ticketed performance, the greater the numerical weight that is assigned to a qualifying event corresponding to the ticketed performance.

Figure 2:
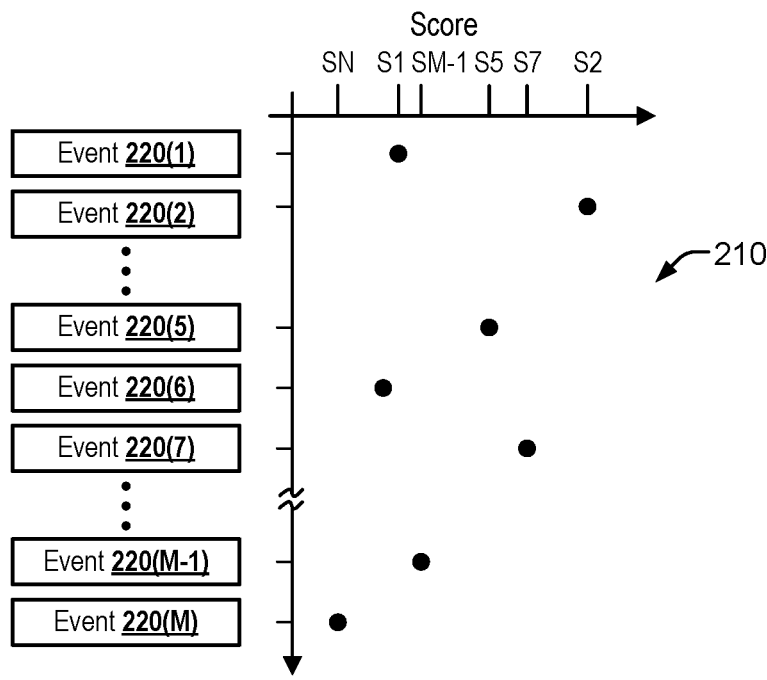
FIG. 2 illustrates an example of a distribution of scores for respective messages that can be incorporated into one or many composite messages generated in accordance with aspects of this disclosure.

FIG. 2 schematically illustrates a distribution 210 of priority scores for a set of qualifying events, for a specific user account: {event 220(1), event 220(2), . . . , event 220(M-1), event 220(M)}. According to the example distribution 210, the event 220(2) can have the highest priority score S2, event 220(7) can have the second-highest score S7, event 220(5) can have the third-highest priority score S5, and so forth. In some instances, M can be of the order of tens of thousands. The disclosed technologies, however, are not limited to a particular value of M. It is the blending of a set of defined actions and a set of defined event model reasons and the qualification process described above that determine the actual value of M.

The message composition module 106 can utilize priority scores to prioritize respective events selected from the qualifying events identified by the response message 124. To that end, the message composition module 106 can order the multiple priority scores in descending order to generate a ranking of priority scores. The message composition module 106 can then select a specific number of events based on the ranking of priority scores. In one example, the message composition module 106 can select the respective priority scores of a group of events that are equal to or greater than a threshold score. In another example, the message composition module 106 can select a threshold number of highest-ranked events, e.g., top three individual electronic messages, top five individual electronic messages, top 10 individual electronic messages, or the like.

After qualifying events are prioritized and selected, the message composition module 106 can generate individual electronic messages for respective selected events. Each one of the individual electronic messages corresponds to both a ticketed performance event and an event model reason. An example individual electronic message can correspond to a Jason Aldean concert included in the "Ride All Night" tour at Blossom Music Center, and also can correspond to an "On Sale" reason code. Another example individual electronic message can correspond to a Cleveland Cavaliers basketball game at Quicken Loans Arena, and also can correspond to a "Good Deal Sports" reason code. As is illustrated in FIG. 1, the individual electronic messages can include, for example, a set of N messages: {message 128(1), message 128(2), . . . , message 128(N-1), message 128(N)}.

Here, N can be less than M. Therefore, by ranking and selecting qualifying events, the messaging system 102 can only allocate computing resources to the generation of the most contextually-relevant individual electronic messages. As a result, the computing performance of the messaging system 102 can be improved over that of conventional systems utilized by service platforms to routinely communicate with subscribers. Thus, service platforms that include the messaging system 102 or are functionally coupled to the messaging system 102 also can exhibit improved performance over conventional service platforms that routinely communicate with subscribers.

Each one of the individual electronic messages can be assigned the priority score of the qualifying event that originated the individual electronic message. The message composition module 106 can assign the priority score to the individual electronic message. According to the example distribution 210, FIG. 2, message 128(2) (as shown in FIG. 1) can have the highest priority score S2, message 128(7) can have the second-highest score S7, message 128(5) can have the third-highest priority score S5, and so forth.

The message composition module 106 can incorporate all or a subset of the generated individual electronic messages into the composite message 130. As an illustration, using the example distribution 210, FIG. 2, the message composition module 106 can select the top-three ranked individual electronic messages, e.g., message 128(2), message 128(7), and message 128(5) and can incorporate such messages into the composite message 130. Such a selection and incorporation are collectively depicted with dashed lines in FIG. 1.

Regardless of the distribution of priority scores that is utilized, the composite message 130 can pair the user 138 with ticketed performances corresponding to the selected individual electronic messages included in the composite message 130. Because such ticketed performances result from the blending of actions in a user action profile of the user 138 and the event model reasons of the qualifying events identified in the response message 124, the composite message 130 is contextually relevant to the user 138. The composite message 130 also is unique and personalized to the user 138.

To generate the composite message 130, incorporating individual electronic messages, the message composition module 106 can generate a user interface (UI) that includes a layout of defined areas assigned to respective ones of the individual electronic messages. The message composition module 106 can generate such a UI by generating formatting information (in markup language, for example) that defines the layout of defined areas. To that end, the message composition module 106 can apply one or many rules to a distribution of priority scores of the individual electronic messages. Such rule(s) dictate the arrangement and/or features of the defined areas in the layout. The rule(s) can be retained in one or more memory devices (referred to as layout rules 112).

As another part of the generation of the composite message 130, the message composition module 106 also can generate output data defining a description that explains the underlying factors for the user receiving the composite message 130. The description can correspond to an individual electronic message and the underlying factors can represent an action in a user action profile and an event model reason that resulted in the generation of such an individual electronic message. In some embodiments, the individual electronic message can correspond to a highest-ranked event (e.g., event 220(2) in FIG. 2) having the highest priority score according to a weighting scheme to determine priority scores. An example description can be "Because you follow the Celtics: Hawks and Celtics 33% below 90-day moving average." Another example description can be "Because you browsed the event: Jay-Z at Oracle tickets dropped 20% in last 24 hours." Yet another example description can be "Because you browsed Jay-Z, we thought you would want to know tickets for related artist Kanye recently went on sale." Still another example description can be "Because you follow 2Cellos on Insta: Tickets for Lindsey Stirling In Concert @ Quicken Loans Arena on sale now."

In some embodiments, the output data that defines such a description can be based at least on an analysis of a user action profile of a user account for which the composite message 130 is being generated. The message composition module 106 can analyze activity data included in the user action profile to determine activity records having a threshold level of relevancy with respect to qualifying events selected for the composition of the composite message 130. For instance, an activity record can convey that a user made a prior purchase of a ticket for a particular band performance, and the user had a browsing history indicating an interest in a home show. In a situation where a first qualifying event of the qualifying events indicates a price change for an upcoming performance for that particular band and a price change for another home show, the message composition module 106 can detect a threshold level of relevancy.

The foregoing example of detection of a threshold level of relevancy is simply illustrative and is not to be construed as limiting. Other suitable techniques can be utilized to determine if a particular user activity record or combination of user activity records has a threshold level of relevancy with respect to a qualifying event. For instance, in a system having records of user activity, such as prior purchases and browsing history, any qualifying event indicating a change of parameters for a ticketed performance that has a common performer name or venue with activity data in the user activity record can be deemed as having a threshold level of relevancy. A confidence level indicating a match between performer names can be used in such an operation.

In response to determining that an activity record in a user action profile has a threshold level of relevancy with respect to one or more qualifying events, the message composition module 106 can generate output data defining a description of reasons for delivering the composite message 130. An example of a description of a reason can include a listing of user action(s) related to the qualifying event, e.g., "We recommend this discount to you for Rock Dog Band and the Home Show because of your prior purchases and your shopping history."

Regardless of the manner of generating the output data that defines a description, the description personalizes the composite message 130 and provides a context for delivering the composite message 130. Thus, in contrast to messages generated according to conventional technologies, the description(s) can increase the likelihood of the composite message 130 being accessed by the user 138, as opposed to being deleted or otherwise directed to a spam folder.

In some embodiments, the message composition module 106 can generate a first description of a first reason corresponding to a first qualifying event associated with a first individual electronic message. The first individual message can be, for example, the highest ranked message in a group of individual messages included in the composite message 130. In some embodiments, only the first description can be presented in response to presenting the composite message 130. The message composition module 106 also can generate a second description of a second reason corresponding to a second qualifying event associated with a second individual electronic message. Both the first description and the second description can be presented in response to presenting the composite message 130.

The message composition module 106 can generate the composite message 130 according to different types and/or formats of presentation of information. In one example, the composite message 130 can be embodied in an HTML email message that includes formatting information that defines a user interface (UI) incorporating the individual electronic messages that constitute the composite message 130. The formatting information can define, as mentioned, a layout of specific areas populated by respective ones of the individual electronic messages. In another example, the composite message 130 can be embodied in a webpage including such a UI. In yet another example, the composite message 130 can be embodied in a text message, such as a SMS message, an MMS message, an iMessage message, or the like. The composite message 130 can format the text message to include a selectable visual element that, in response to being selected, causes a user device (e.g., the user device 140) that presents the text message to launch a web browser to present a webpage including the UI mentioned above.

The message composition module 106 can generate the composite message 130 periodically, e.g., weekly, bi-weekly, or monthly. After the composite message 130 is generated, a message transmission module 108 can send the composite message 130 to a communication address corresponding to a user account of the user 138. To that end, a message transmission module 108 can send the composite message 130 at a select time to the communication address. In some implementations, the message transmission module 108 can send the composite message 130 to the communication address on a weekly basis—e.g., on a particular day of the week and at a particular time, such as on Friday at 9:00 AM local time. According to an example, the composite message 130 can be embodied in an email message (an HTML email, for example) and the communication address can be embodied in an email address. According to another example, the composite message 130 can be embodied in a text message (e.g., a SMS message, an MMS message, or an iMessage message) and the communication address can be embodied in a telephone number. Therefore, not only does the messaging system 102 provide unified, contextually-relevant composite messages to the user 138, but also can reduce the amount of computing resources (e.g., processing cycles, network bandwidth, or the like) utilized to generate and communicate the composite message 130 to the user 138.

Regardless of its type and format, the composite message 130 can be presented at the user device 140 associated with the user 138. Presentation of the composite message 130 can result in the presentation of a UI that includes a description, as is described above. As is illustrated in FIG. 1, presentation of the composite message 130 at the user device 140 can result in the presentation of a UI 160 that includes indicia 164 that conveys such a description. For example, in an embodiment in which the composite message 130 is embodied in an email message, the subject line of the email message can include the description.

The UI that is presented in response to presenting the composite message 130, e.g., the UI 160, also includes a group of individual electronic messages sorted and selected by blending actions and event model reasons as is discussed above. Each message in the group of individual electronic messages is arranged within the UI according to a respective priority score of the message. Referring back to the example in which such a group of individual electronic messages includes message 128(2), message 128(7), and message 128(5), presentation of the composite message 130 can result in the presentation of the UI 160 including such individual electronic messages. In addition, the message 128(2) having the highest priority score S2 can be arranged adjacent to the indicia 164; the message 128(7) having the second-highest score S7 can be arranged beneath the message 128(2); and the message 128(5) having the third-highest score S5 can be arranged beneath the message 128(7).

Further, the UI 160 also can include visual elements that convey respective reason codes corresponding to the message 128(2), message 128(5), and message 128(7). The visual elements can be arranged adjacent to respective ones of message 128(2), message 128(5), and message 128(7). As is illustrated in the UI 160, a first visual element can convey a first reason code ("Reason Code 1") pertaining to the message 128(2). An example of the first reason code can be "Good Deal Sports" A second visual element can convey a second reason code ("Reason Code 2") pertaining to the message 128(7). An example of the second reason code can be "Price Drop." A third visual element can convey a third reason code ("Reason Code 3") pertaining to the message 128(5). An example of the third reason code can be "Rivalry." These examples of the first reason code, second reason code, and third reason code are simply illustrative. Other reason codes can correspond to the message 128(2), message 128(5), and message 128(7). In addition, the first reason code, the second reason code, and the third reason code need not be different. In some instances, those reason codes can be the same, e.g., "Good Deal Sports."

Figure 3:
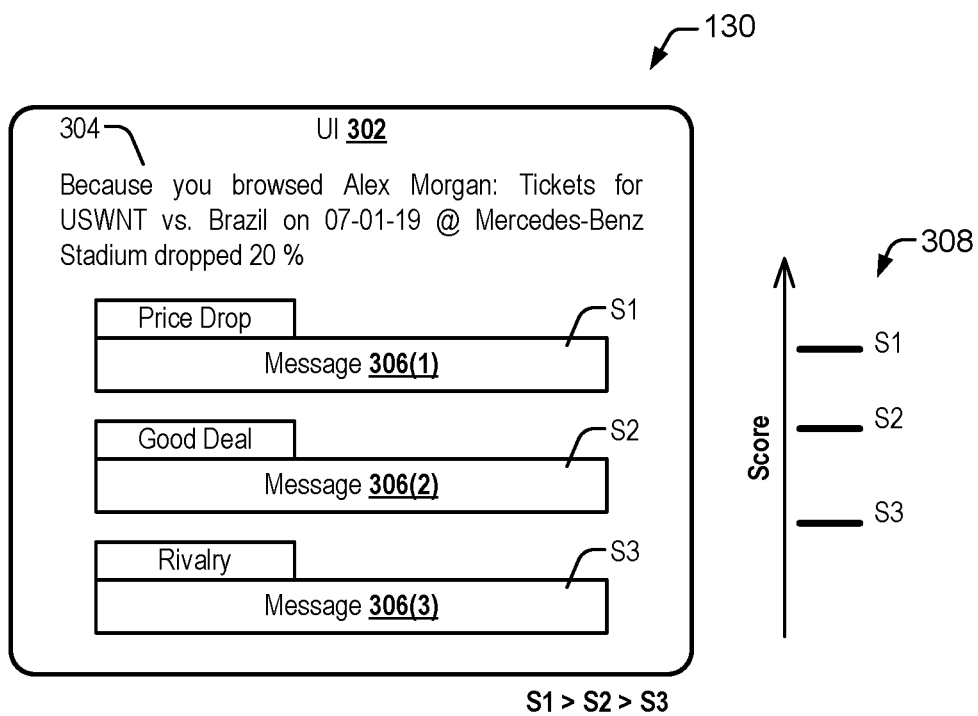
FIG. 3 illustrates an example of a composite message generated in accordance with aspects disclosed herein.

More concretely, FIG. 3 presents an example of a UI 302 that is presented in response to presentation of the composite message 130. The UI 302 includes a description 304 and three individual electronic messages 306(1)-306(3) and respective reason codes. The individual electronic message 306(1) has a first priority score S1 and the associated reason code is "Price Drop." The individual electronic message 306(2) has a second priority score S2 and the associated reason code is "Good Deal." The third individual electronic message 306(3) has a third priority score S3 and the associated reason code is "Rivalry." As is shown in diagram 308, the first priority score S1 is greater than the second priority S2, which in turn is greater than the third priority score S3. In accordance with aspects discussed herein, placement of the individual electronic messages 306(1)-306(3) within the UI 302 is based on the relative magnitude of such priority scores, where the higher the priority score, the closer the individual electronic message is to the description 304.

Figure 4:
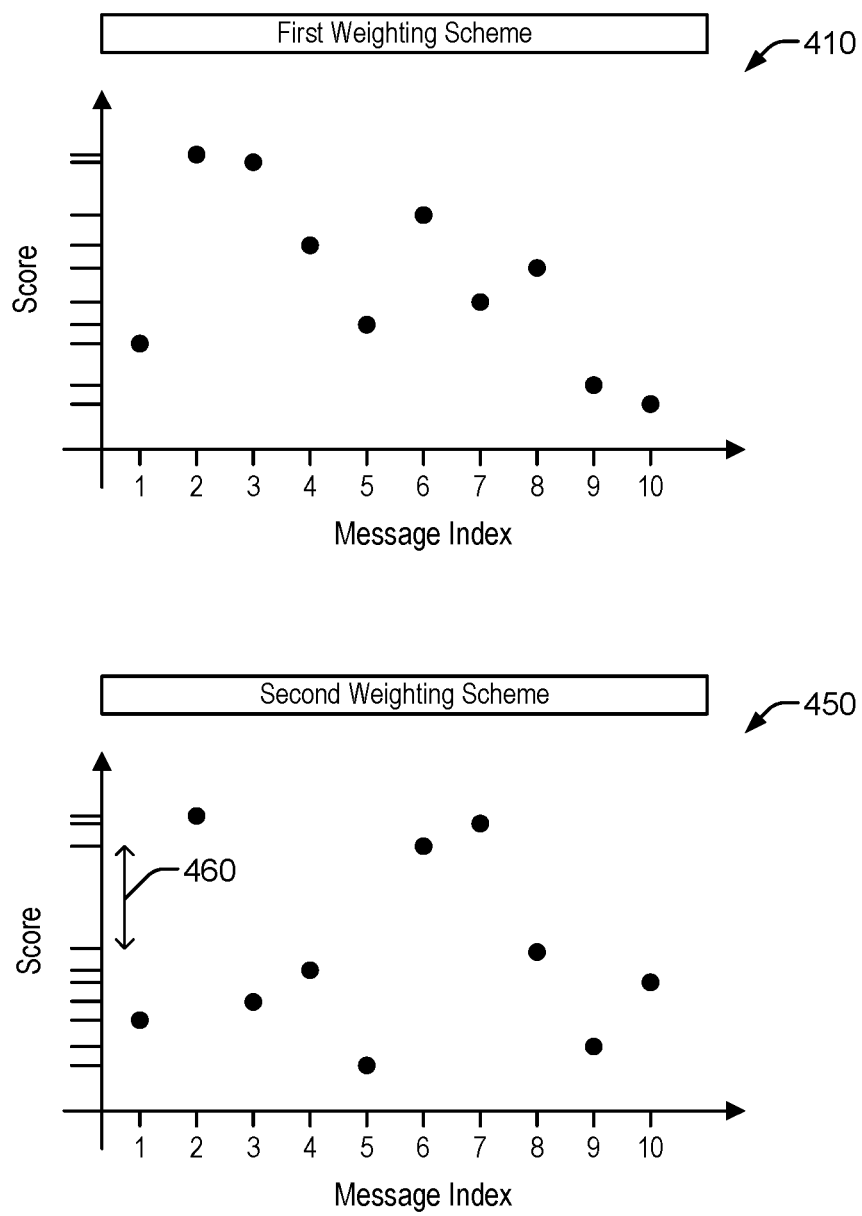
FIG. 4 illustrates examples of distributions of priority scores for respective messages that can be incorporated into one or many of the composite messages generated in accordance with aspects disclosed herein. Each score in a first distribution of the example distributions is computed using a first weighting scheme, and each score in a second distribution of the example distributions is computed using a second weighting scheme.

As is illustrated in diagram 410, FIG. 4, the message composition module 106 can determine a first priority score distribution according to a first weighting scheme. A group of ten individual electronic messages is shown for the sake of illustration. The first weighting scheme yields, for example, two individual electronic messages (messages 2 and 3) having similar priority scores, e.g., priority scores having a relative difference of a few percentage points. The first weighing scheme also yields eight other individual electronic messages (message 1 and messages 4 to 10) having different respective priority scores.

Similar priority scores can correspond to respective ticketed events having a comparable degree of relevancy for the user 138. More specifically, the individual electronic message 2 and the individual electronic message 3 in the diagram 410 can correspond to respective ticketed performances arising from blending actions and event model reasons that yield similar weights based on the first weighting scheme. For instance, a first ticketed performance (for message 2, for example) can be a concert from a band in the Rock & Roll Hall of Fame. Such a performance can arise from a "Good Deal" reason code and a "performer follow" action, for example. In addition, a second ticketed performance (for message 3, for example) can be another concert from another band in the Rock & Roll Hall of Fame. Such a performance also can arise from a "Good Deal" reason code and a "performer follow" action, for example.

In turn, as is illustrated in diagram 450 in FIG. 4, the message composition module 106 can determine a second priority score distribution for messages 1 to 10 according to a second weighting scheme. The second priority distribution exhibits a score gap 460 between two groups of priority scores: A first a group includes the priority scores of three individual electronic messages (messages 2, 6, and 7) and a second group includes the priority scores of the remaining seven individual electronic messages (messages 1, 3-5, and 8-10). In this disclosure, a score gap in a distribution of priority scores separates high-lying scores from low-lying scores. The score gap represents a score difference between two successive groups of scores that is several times greater than the average score difference between successive scores within each group. A high-lying score can correspond to an individual electronic message for a "specialty" ticketed performance, such as a concert for a band reunion, a concert included in a farewell tour, an exhibition soccer game for a charitable cause, or the like. A qualifying event that has a high-lying score can be associated with, for example, a "Specialty" reason code, a "High Demand" reason code, or another type of reason code that conveys the rather unique aspects of the ticketed performance. In the example in diagram 450, priority scores S2, S6, S7 corresponding to messages 2, 6, and 7 are high-lying scores. In turn, scores S1, S3, S4, S5, S8, S9, and S10 are low-lying scores.

The message composition module 106 can utilize priority scores of individual electronic messages to generate formatting information that indicates placement of each one of the individual electronic messages within a composite message 130. The formatting information can define a layout of areas within a UI representative of the composite message 130. In some configurations, each one of the areas can have a size and/or a shape that is determined by a respective priority score. The message composition module 106 can assign the individual electronic messages to respective ones of the defined areas. In one implementation, as is illustrated in diagram 508 of FIG. 5, a group of four individual electronic messages can have a priority score distribution in which an individual electronic message 506(1) and an individual electronic message 506(2) have respective priority scores S1 and S2 that are similar (e.g., the relative difference between S1 and S2 is perhaps a few percentage points). A third individual electronic message 506(3) has a priority score S3 and a fourth individual electronic message 506(4) has a priority score S4, where S3<S2 and S3>S4.

Because S1 and S2 are similar, the message composition module 106 can define a layout in which the individual electronic message 506(1) and the individual electronic message 506(2) are arranged in similar positions. In such a layout, for example, the individual electronic message 506(1) and the individual electronic message 506(2) can be arranged adjacent to each other, and also adjacent to a description 504. In addition, in the layout, the individual electronic message 506(3) can be arranged below the individual electronic messages 506(1) and 506(2), and above the individual electronic message 506(4). The UI 502 in FIG. 5 illustrates such an arrangement.

A first reason code (exemplified with the "On Sale" code in the UI 502 in FIG. 5) can be associated with both individual electronic messages 506(1) and 506(2), for example. The layout also includes a defined area for the first reason code. A second reason code and a third reason code (labeled as "Reason Code 1" and "Reason Code 2" in the UI 502 in FIG. 5) are associated with individual electronic messages 506(3) and 506(4), respectively. The layout includes defined areas for the second and third reason codes.

In another example, as is illustrated in the diagram 612 of FIG. 6A, a group of four individual electronic messages can have a priority score distribution exhibiting a score gap (marked with a double-arrowhead segment). Such a group includes a subset of two individual electronic messages having low-lying scores S4 and S3, where S3>S4. The group also has a second subset of two individual electronic messages having high-lying scores S2 and S1, where S1 >S2. The message composition module 106 can define a layout that includes a first defined area that is assigned to a first individual electronic message 606(1) having the priority score S1. The first defined area is positioned at a defined distance from a first edge 612a of a UI 602 that constitutes the the composite message 130. The UI 602 also includes a second edge 612b that is opposite to the first edge 612a, and a third edge 612c that is opposite to a fourth edge 612d. In terms of the conventional flow of reading (left to right) in Western literature, the first edge 612a, the second edge 612b, the third edge 612c, and the fourth edge 612d may be referred to as a "top edge," "bottom edge," "left edge," and "right edge" of the UI 602, respectively. Other nomenclatures for the edges 612a to 612d may be utilized in other cultures having a different flow of reading.

Because the second individual electronic message 606(1) has a high-lying priority score, the layout can include a video area 608 arranged adjacent to the first defined area. The first defined area and the video area 608 are both adjacent to a description 604. The UI 602 in FIG. 6A illustrates such an arrangement. The first defined area and the video area 608 are shown as having a same size and shape simply as an illustration. The disclosure is not limited in that respect and the size and/or shape of the first area and the video area 608 can be different.

The message composition module 106 also can generate formatting information that can specify a video asset (a live-action video segment, an animation, etc.) to be reproduced within the video area 608 in response to presentation of the UI 602 for the composite message 130. The video asset can be related to first individual electronic message 606(1) and can be retained in one or more memory devices 114 (referred to as media assets 114), FIG. 1.

Such a layout related to the UI 602 also includes a second defined area that is assigned to a second individual electronic message 606(2) that has the priority score S2. The second defined area is positioned at a second defined distance from the first edge 612a. The second defined distance is greater than the defined distance at which the individual electronic message 606(1) is positioned relative to the first edge 612a. A first reason code is associated with the individual electronic messages 606(2). Because the second individual electronic message 606(2) also has a high-lying priority score, albeit less than S1, the layout can further include an image area 610 arranged adjacent to the second individual electronic message 606(2). The size and/or shape of the image area 610 also can be determined by the priority score S2.

The message composition module 106 can generate formatting information that can specify an image to be displayed within the image area 610 in response to presentation of the UI 602 for the composite message 130. The image can be related to the second individual electronic message 606(2) and can be retained in the media assets 114, FIG. 1.

The layout further includes third and fourth defined areas that are respectively assigned to an individual electronic message 606(3) and an individual electronic message 606(4) having respective low-lying priority scores S3 and S4 (see diagram 614 in FIG. 6A). The layout, however, does not include media areas corresponding to such messages because of the low-lying nature of the priority scores S3 and S4. As is illustrated in the UI 602 in FIG. 6A, the individual electronic message 606(3) is arranged below the image area 610 and above the individual electronic message 606(4). A second reason code and a third reason code (labeled as "Reason Code 2" and "Reason Code 3") are associated with the individual electronic messages 606(3) and 606(4), respectively.

Besides the arrangements of individual electronic messages that are disclosed with reference to FIGS. 3, 5, and 6A, the message composition module 106 can provide other arrangements of individual electronic messages based at least on the priority scores of such messages. In particular, the message composition module 106 can generate formatting information that indicates relative placement prominence of individual electronic messages within a UI that represents the composite message 130. The relative placement prominence can be determined by the priority scores of the individual electronic messages incorporated into the composite message 130.

Using the direction of reading flow in Western literature as an orientation reference, in some configurations, individual electronic messages having greater priority scores can be arranged more closely to the top edge of the UI. Thus, placement prominence of an individual electronic message within a composite message 130 can be represented by a distance at which the individual electronic message is positioned relative to the top edge of the UI. A greater priority score can result in a shorter distance from the top edge. In other configurations, placement prominence of an individual electronic message can be represented by a distance from the right edge of the UI. Simply as an illustration, in Middle Eastern culture, individual electronic messages having greater priority scores can be arranged more closely to the right edge of the UI. In yet other configurations, placement prominence of an individual electronic message can be represented by a distance from the left edge of the UI. Thus, individual electronic messages having greater priority scores can be arranged more closely to the right edge of the UI.

In addition to placement prominence of an individual electronic message, the message composition module 106 also can utilize priority scores of individual electronic messages to generate formatting information that indicates structural prominence of each one of the individual electronic messages within a composite message 130. A greater priority score can dictate a greater structural prominence of an individual electronic message. Similar priority scores can dictate similar structural prominence of individual electronic messages.

The structural prominence of an individual electronic message can be determined by one or multiple features of the area assigned to the message in a layout of areas within the composite message 130. Thus, the structural prominence of the individual electronic message can refer to the prominence of the area itself and can be represented by one or many display attributes of the area. In one configuration, the structural prominence of an individual electronic message can refer to a size, a shape, a color, and/or a shading of an area corresponding to the message. In some configurations, the structural prominence of the individual electronic message can refer to a group of particular indicia, such as particular images or font types, present in the area corresponding to the message. In other configurations, structural prominence can refer to a brightness with which the area is displayed when the composite message 130 is presented in a user device. In yet other configurations, structural prominence of an individual electronic message can refer to a particular combination of size, shape, color, brightness, and presence of particular indicia in the area corresponding to the message.

Accordingly, with further reference to FIG. 6A, the first defined area that corresponds to the individual electronic message 606(1) can have a size and/or a shape based on the priority score S1. The second defined area that corresponds to the individual electronic message 606(2) can have a size and/or a shape based on the priority score S2. Because S1 is greater that S2 (see diagram 614 in FIG. 6A) the size of the first defined area can be, in one configuration, greater than the size of the second defined area. In another configuration, the shape of the first defined area can be different from the shape of the second defined area.

Figure 6B:
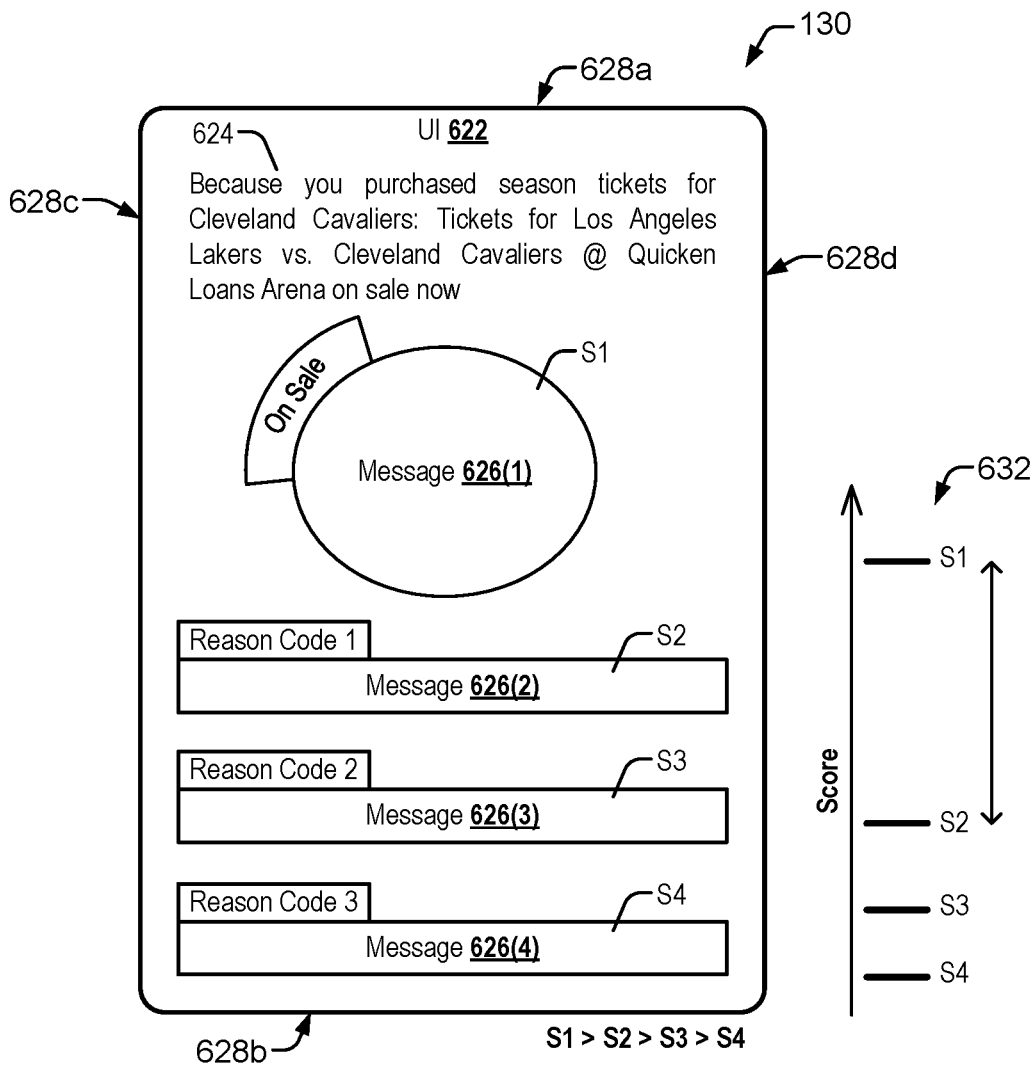
FIG. 6B illustrates another example of a composite message generated in accordance with aspects disclosed herein.
Figure 6C:
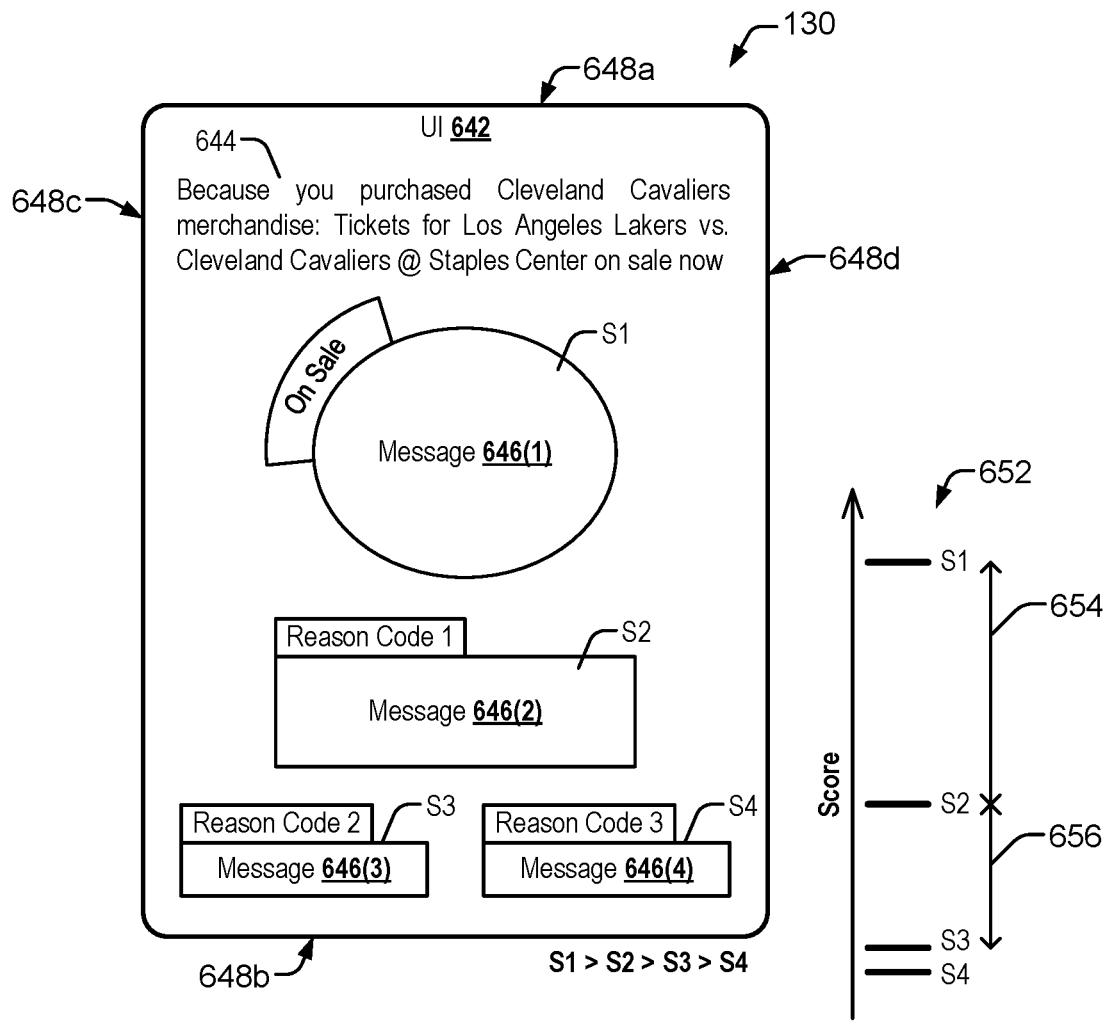
FIG. 6C illustrates another example of a composite message generated in accordance with aspects disclosed herein.

FIG. 6B and FIG. 6C present other examples of UIs that include respective layouts of individual electronic messages, where each individual electronic message is presented within a UI with a prominence determined by the priority score of the message. Specifically, as is shown in the diagram 632 of FIG. 6B, a group of four individual electronic messages can have a priority score distribution exhibiting a score gap (marked with a double-arrowhead segment). Such a group has a single individual electronic message having high-lying score S1, where S1>S2. The group also has three individual electronic messages having low-lying scores S2, S4, and S3, where S2>S3>S4.

The message composition module 106 can define a layout of areas within the UI 622, each defined area assigned to one of the four individual electronic messages. The layout includes a first defined area that is assigned to a first individual electronic message 626(1) having the priority score S1. The first defined area has a size and a shape based on the priority score S1. The first defined area is positioned at a defined distance from a first edge 628a of the UI 622. The UI 622 also includes a second edge 628b that is opposite to the first edge 628a, and a third edge 628c that is opposite to a fourth edge 628d. In some instances, the first edge 628a, the second edge 628b, the third edge 628c, and the fourth edge 628d may be referred to as "top edge," "bottom edge," "left edge," and "right edge" of the UI 622, respectively.

As is illustrated in FIG. 6B, because the first individual electronic message 626(1) has a high-lying priority score, the first defined area can be more prominent than the other defined areas in the layout. As such, the first defined area can have a size and/or a shape that is different from the sizes and shapes of the other defined areas. As an example, the first defined area is shaped as an ellipse, whereas the other defined areas can be shaped as rectangles. The greater prominence of the first defined area also is represented by arranging the first defined area adjacent to a description 624 within the UI 622.

The layout related to the UI 622 also includes second, third, and fourth defined areas that are respectively assigned to an individual electronic message 626(2), an individual electronic message 626(3), and an individual electronic message 626(4) having the low-lying priority scores S2, S3 and S4 (see diagram 632 in FIG. 6B). The prominence of each of the second, third, and fourth defined areas can be comparable because of the low-lying nature of the priority scores S2, S3 and S4. Accordingly, as an example, each one of the individual electronic messages 626(2)-626(4) is assigned a defined area of rectangular shape having a same size.

Further, the lesser prominence of the individual electronic messages 626(2)-626(4) relative to the individual electronic message 626(1) also is represented by the arrangement of such messages. Such an arrangement also is determined by the priority scores of the individual electronic messages 626(2)-626(4). Specifically, the individual electronic message 626(2) having priority score S2 is arranged below, and adjacent to, the individual electronic message 626(1). The term "below" is relative to the first edge 628a (the top edge). Thus, the individual electronic message 626(2) is positioned at a second defined distance from the first edge 628a. The second defined distance is greater than the defined distance at which the individual electronic message 626(1) is positioned relative to the first edge 628a. In turn, the individual electronic message 626(3) having priority score S3 (less than S2) is arranged below, and adjacent to, the individual electronic message 626(2). Further, the individual electronic message 626(4) having priority score S4 (less than S3) is arranged below, and adjacent to, the individual electronic message 626(4).

Each one of the defined areas in the layout is associated with a UI element representative of a reason code pertaining to the electronic individual message assigned to the defined area. As an illustration, as is shown in the UI 622, an "On Sale" code is associated with the individual electronic message 626(1). A second reason code, a third reason code, and a fourth reason code (labeled as "Reason Code 1," "Reason Code 2," and "Reason Code 3") are respectively associated with the individual electronic messages 626(2)-626(4).

FIG. 6C presents another example of an arrangement of individual electronic message having different prominence. As is shown in diagram 652, a group of four individual electronic messages can have a priority score distribution exhibiting two score gaps (each marked with a double-arrowhead segment). A first score gap 654 separates a first individual electronic message having a high-lying score S1 from a second individual electronic message having a second high-lying score S2, where S1>S2. A second score gap 656 separates the second individual electronic message from a set of two individual electronic messages having low-lying scores S3 and S4, where S3 and S4 are similar and S3>S4.

The message composition module 106 can define a layout of areas within the UI 642, each defined area assigned to one of the four individual electronic messages. The layout includes a first defined area that is assigned to a first individual electronic message 646(1) having the priority score S1. The first defined area has a size and a shape based on the priority score S1. The first defined area is positioned at a defined distance from a first edge 648a of the UI 642.

The UI 642 also includes a second edge 648*b* that is opposite to the first edge 648*a*, and a third edge 648*c* that is opposite to a fourth edge 648*d*. In some instances, the first edge 648*a*, the second edge 648*b*, the third edge 648*c*, and the fourth edge 648*d* may be referred to as "top edge," "bottom edge," "left edge," and "right edge" of the UI 642, respectively. Because the first individual electronic message 646(1) has a high-lying priority score that is greater than the other priority scores S2, S3, and S4, the first defined area can be more prominent than the other defined areas in the layout. As such, the first defined area can have a size and/or a shape that is different from the sizes and shapes of the other defined areas. In one example, as is shown in FIG. 6C, the first defined area is shaped as an ellipse, whereas the other defined areas can be shaped as rectangles. The greater prominence of the first defined area also is represented by arranging the first defined area adjacent to a description 644 within the UI 642.

The layout related to the UI 642 also includes second defined area assigned to a second individual electronic message 646(2) that has the second high-lying priority score S2. The second defined area is positioned at a second defined distance from the first edge 648*a*. The second defined distance is greater than the defined distance at which the individual electronic message 646(1) is positioned relative to the first edge 648*a*. Because the second individual electronic message 646(2) also has a high-lying priority score, albeit less than S2, the second defined area also can be distinguishable from the other defined areas in the layout. Thus, the second defined area can have a size and/or a shape that is different from the sizes and shapes of other defined areas in the layout. As is illustrated in FIG. 6C, the second defined area is shaped as a rectangle that differs in size from other rectangles representing other defined areas in the layout.

The high-lying nature of the second priority score S2 renders the second defined area more prominent than other defined areas in the layout. In particular, the second defined area can be more prominent than the defined areas that can be assigned to individual electronic messages having low-lying priority scores S3 and S4. Such a relative greater prominence of the second defined area is represented by arranging the second defined area adjacent to the first defined area corresponding to the individual electronic message 646(1).

The layout related to the UI 642 also includes third and fourth defined areas that are respectively assigned to an individual electronic message 646(3) and an individual electronic message 646(4) having the low-lying priority scores S3 and S4 (see diagram 652 in FIG. 6C). The prominence of each one of the third and fourth defined areas can be the same because of the similarity of the low-lying priority scores S3 and S4. Accordingly, as an example, the individual electronic messages 646(3) and 626(4) are assigned respective defined areas of rectangular shape having a same size. The third and fourth defined areas also can be arranged adjacent to one another, and both areas can be arranged adjacent to the area assigned to the individual electronic message 646(2).

The low-lying priority scores S3 and S4 renders the individual electronic messages 646(3) and 646(4) less prominent than both individual electronic messages 646(1) and 646(2). Such lesser prominence can be represented by arranging the individual electronic messages 646(3) and 646(4) below the individual electronic message 626(2), as is shown in FIG. 6C.

Each one of the defined areas in the layout related to UI 642 is associated with a UI element representative of a reason code pertaining to the electronic individual message assigned to the defined area. As an illustration, as is shown in the UI 642, an "On Sale" code is associated with the individual electronic message 626(1). A second reason code, a third reason code, and a fourth reason code (labeled as "Reason Code 1," "Reason Code 2," and "Reason Code 3") are respectively associated with the individual electronic messages 646(2)-646(4).

In contrast to conventional technologies, by adjusting the prominence of individual electronic messages within a composite message, the disclosed technologies can adjust the contextual relevancy of an individual electronic message within the composite message. Thus, the contextual relevancy of an individual electronic message can be amplified, and a subscriber that receives the message can be more easily steered towards taking action with respect to the ticketed performance or item associated with the individual electronic message. Accordingly, the efficacy of the composite message can be improved relative to the efficacy of existing message delivery platforms.

An individual electronic message included in a composite message 130 can include visual elements that convey details of a ticketed performance. In some instances, the individual electronic message also includes other visual elements that can quantify a specific reason code ("On Sale," "Price Drop," "Good Deal," and the like) associated with the individual electronic message.

Figure 7A:
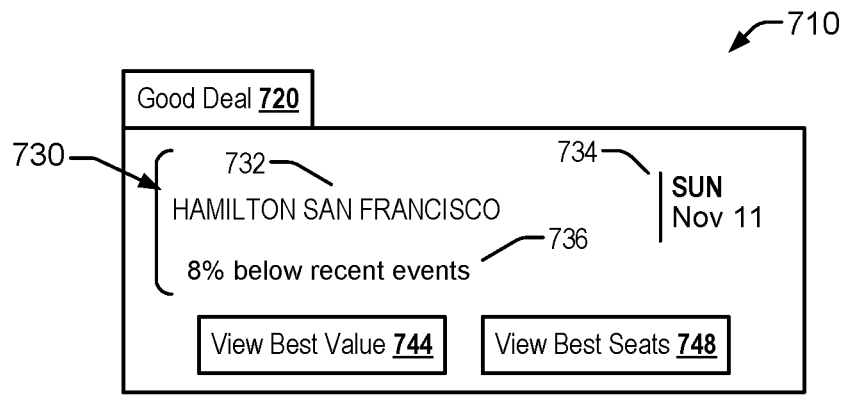
FIG. 7A illustrates an example of an individual message that can be incorporated into one or many composite messages generated in accordance with aspects disclosed herein.

FIG. 7A schematically presents an example of an individual electronic message 710 in accordance with this disclosure. The individual electronic message 710 includes a first visual element 720 that conveys a reason code (illustrated as "Good Deal") associated with the individual electronic message 710. The individual electronic message 710 also includes visual elements 730 that can be arranged in separate groups of indicia, each conveying an aspect of the ticked performance. For instance, a first group of indicia 732 identifies the ticketed event, a second group of indicia 734 identifies a date of the ticketed event, and a third group of indicia quantifies a reason code (e.g., the "Good Deal" represents an 8% savings in ticket price relative to other recent events). The information conveyed by the visual elements 730 as is illustrated in FIG. 7A is merely illustrative. Additional information (e.g., number of available tickets), less information, or different information altogether can be included in the visual elements 730.

Because composite messages arise from the blending of qualifying events and qualifying action, the individual messages included in the composite message 130 can be empirically manipulated by contextualizing specific online behaviors. Thus, in some embodiments, the UI that is presented in response to presenting the composite message 130 (e.g., the UI 160, FIG. 1; UI 302, FIG. 3; UI 502, FIG. 5; or UI 602, FIG. 6A) can include a selectable visual element that conveys a mechanism for improving or otherwise changing the ticketed performance events identified in the composite message 130. For example, the selectable visual element can include text, such as "Improve Concert Recommendations: Sync Your Spotify Library," that specifies a behavior that can be performed in order to modify such ticketed performance events. Selection of the selectable visual element can cause, for example, the database management server 136 to collect data that results in updated user action profiles 122. Updates to the user action profiles 122 can result in updates to the qualifying events identified in a response message 124, which can yield an updated composite message 130.

Figure 7B:
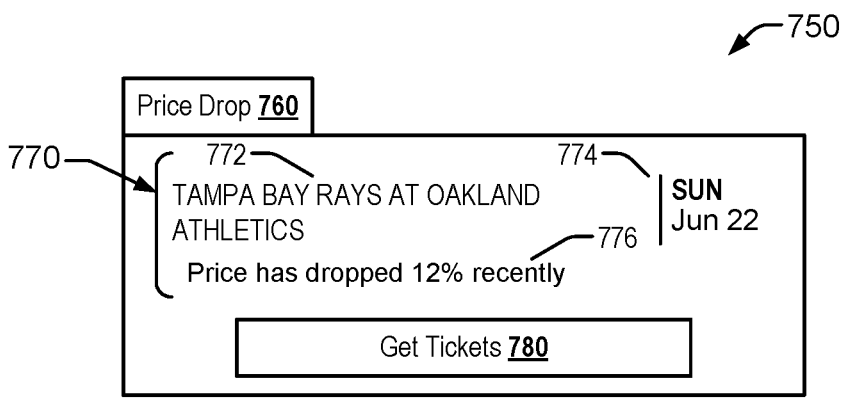
FIG. 7B illustrates another example of an individual message that can be incorporated into one or many composite messages generated in accordance with aspects disclosed herein.

In turn, FIG. 7B schematically presents an example of an individual electronic message 750 in accordance with this disclosure. The individual electronic message 750 includes a first visual element 760 that conveys a reason code (illustrated as "Price Drop") associated with the individual electronic message 750. In addition, the individual electronic message 750 includes visual elements 770 that can be arranged in separate groups of indicia, each conveying an aspect of a ticked performance. For instance, a first group of indicia 772 identifies the ticketed performance, a second group of indicia 774 identifies a date of the ticketed performance, and a third group of indicia 776 quantifies the reason code (e.g., the "Price Drop" represents a 12% drop in recent pricing). The information conveyed by the visual elements 770 as is illustrated in FIG. 7B is merely illustrative. Additional information (e.g., number of available tickets); less information; or different information altogether can be included in the visual elements 770.

An individual electronic message included in a composite message 130 also can include one or many selectable visual elements. Selection of each one of such elements can cause a user device (e.g., user device 140) that presents the individual electronic message to present a UI to peruse a seating chart of a venue, complete a purchase of a ticket, and/or perform another action related to the ticketed event. Thus, the UI can present one or several value attributes of the ticketed performance, e.g., seat prices, parking privileges, concession discounts, a combination thereof, or the like, for a venue.

As an illustration, the individual electronic message 710, FIG. 7A, can include a first selectable visual element 744 (labeled "View Best Value," as an illustration). Selection of the first selectable visual element 744 can cause the user device (e.g., user device 140, FIG. 1) to present a UI (not depicted in FIG. 7A) including a listing or seat chart of select seats. Such seats can provide a satisfactory (e.g., best, second-best, or the like) tradeoff between price and location relative to a performance stage for the ticketed performance identified by the group of indicia 732. In addition, the individual electronic message 710 can include a second selectable visual element 748 (labeled "View Best Seats," as an illustration). Selection of the second selectable visual element 748 can cause the user device to present a listing or seating chart of the best seats available for such a ticketed performance event.

As another illustration, the individual electronic message 750, FIG. 7B, can include a selectable visual element 780 (labeled "Get Tickets," as an illustration). Selection of the selectable visual element 780 can cause a user device to present a UI (not depicted in FIG. 7B) that permits the recipient subscriber to purchase ticket(s). The ticket(s) can be a general admission ticket or a ticket with a defined seat assignment.

Based at least on the foregoing description, in sharp contrast to existing technologies, it is clear that the composite message 130 captures digital marketplace knowledge and subscriber knowledge, presenting a single unified interface that has incorporated both supply side and demand side factors. As a result, not only does the messaging system 102 provide unified, contextually-relevant messages to a customer, but it also can reduce the amount of computing resources (e.g., network bandwidth) utilized to communicate the composite message 130 to the subscriber.

Figure 8:
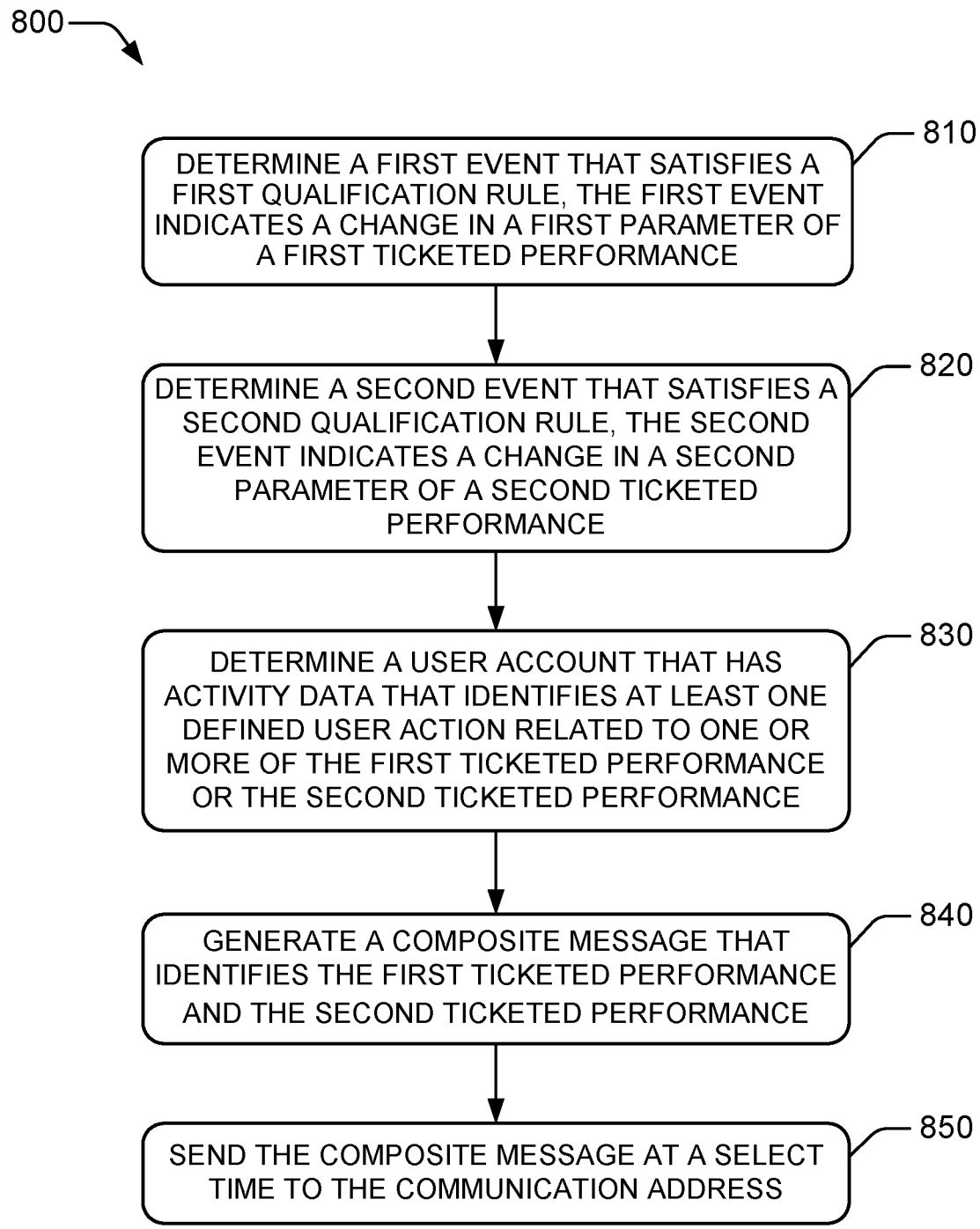
FIG. 8 illustrates an example of a process for generating a composite message using qualifying events and actions, in accordance with one or more embodiments of this disclosure.

FIG. 8 illustrates a flow diagram of an example method 800 for generating composite messages using qualifying events and qualifying actions, in accordance with one or more embodiments of this disclosure. Aspects of the example method 800 are illustrated with reference to FIGS. 1-7B. Although the example method 800 is illustrated with reference to ticketed performances, the example method 800 is not limited in that respect. Indeed, the example method 800 can be implemented for composite electronic messages related to any kind of item that is commercialized in a digital marketplace, such as hotel room reservations, car rental reservations, plane ticket reservations, and the like. The example method 800 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other techniques described throughout this disclosure can be interpreted accordingly.

A computing system can implement, entirely or partially, the example method 800. The computing system includes or is functionally coupled to one or more processors, one or more memory devices, other types of computing resources, a combination thereof, or the like. Such processor(s), memory device(s), computing resource(s), individually or in a particular combination, permit or otherwise facilitate implementing the example method 800. The computing resources can include operating systems (O/Ss); software for configuration and/or control of a virtualized environment; firmware; central processing unit(s) (CPU(s)); graphics processing unit(s) (GPU(s)); virtual memory; disk space; downstream bandwidth and/or upstream bandwidth; interface(s) (I/O interface devices, programming interface(s) (such as application programming interfaces (APIs), etc.); controller devices(s); power supplies; a combination of the foregoing; or the like.

The example method 800 shown in FIG. 8 begins at block 810, where the computing system 102 can determine a first event that satisfies a first qualification rule or another type of qualification criterion (a specific type of good deal category, a particular price-drop instance, or an on-sale instance). In one example, the first event indicates a change in a first parameter of a first ticketed performance. Determining the first event can include, in some embodiments, sending a query representative of the first qualification rule to a database (e.g., database 116). In one example, the query is one of the queries 114*a*. In other embodiments, determining the first event can include receiving data indicative of the first event and determining that the change in the first parameter satisfies the first qualification rule. In some embodiments, the computing system can execute the qualification module 104, or another type of software component with similar functionality, to determine the first event.

At block 820, the computing system can determine a second event that satisfies a second qualification rule or another type of qualification criterion (a specific type of good deal category, a particular price-drop instance, or an on-sale instance). In one example, the second event indicates a change in a second parameter of a second ticketed performance. Determining the second event can include, in some embodiments, sending a query representative of the second qualification rule to the database (e.g., database 116). In one example, the query is another one of the queries 114*a*, FIG. 1. In other embodiments, determining the second event can include receiving data indicative of the second event and determining that the change in the second parameter satisfies the second qualification rule. In some embodiments, the computing system can execute the qualification module 104, or another type of software component with similar functionality, to determine the second event.

At block 830, the computing system can determine a user account that has activity data that identifies at least one defined user action related to one or more of the first ticketed performance or the second ticketed performance. The user account can be identified in the qualifying accounts 126 and, thus, the at least one defined user action can be a qualifying action. The activity data can include activity records indicative of the at least one defined user action. The activity data can be included, for example, in a user action profile pertaining to the user account. The user action profile can be included in the user action profiles 122. Determining the user account can include, in some embodiments, sending a query representative of the defined action to the database referred to in blocks 810 and 820. In one example, the query is one of the queries 114b, FIG. 1. In other embodiments, determining the user account can include receiving the activity data, and analyzing the activity data to determine that the user activity data includes one or more activity records identifying respective defined user actions related to the first ticketed performance and/or the second ticketed performance. In some embodiments, the computing system can execute the qualification module 104, or another type of software component with similar functionality, to determine the user account.

At block 840, the computing system can generate a composite message that identifies the first ticketed performance and the second ticketed performance. As is disclosed herein, the composite message can provide a description of a reason for delivering the composite message. In one example, the composite message can be embodied in, or can include, the composite message 130 (see, e.g., FIG. 3, FIG. 5, or FIG. 6A) and the description is represented by the indicia 164 (FIG. 1). In some embodiments, the computing system can execute the message composition module 106, or another type of software component with similar functionality, to generate the composite message.

Generating the composite message can include generating multiple priority scores and ordering the multiple priority scores in descending order, for example, to generate a ranking of priority scores. In addition, the computing system can select a group of priority scores based at least on the ranking of priority scores. The computing system can then generate respective individual electronic messages corresponding to respective ones of the selected group of priority scores. Each one of the multiple individual electronic messages correspond to a ticketed performance, as is disclosed herein.

Moreover, the computing system can generate a UI that includes a layout of defined areas that are assigned to the respective individual electronic messages using at least the ranking of priority scores. Thus, the ranking of priority scores can be referred to as a ranking of placement scores. Generating such a UI can include, for example, generating formatting information that defines the layout of defined areas. The computing system can assign a first defined area (or position) in the layout to a first individual electronic message using a first priority score in the ranking of priority scores. The computing system also can assign a second defined area (or second position) in the layout to a second individual electronic message using a second priority score.

A first message of the respective individual electronic messages included in such layout can correspond to the first ticketed performance corresponding to the first event determined at block 810. In addition, a second message of the respective individual electronic messages can correspond to the second ticketed performance corresponding to the second event determined at block 820. In some implementations, the first message includes a selectable visual element (e.g., element 744 or element 748 in FIG. 7A, or element 780 in FIG. 7B). In such implementations, the example method 800 also can include a block (not depicted in FIG. 8) where the computing system causes a display device to present a second UI in response to the selection of the selectable visual element. The second UI presents one or many value attributes for a first ticketed performance of the respective ticketed performances. The display device can be integrated into a user device or can be functionally coupled, via a wireless or wireline connection, for example, to the user device. The user device (e.g., user device 140, FIG. 1) can correspond to the user account determined at block 830.

Generating the composite message also can include generating output data defining a description that explains a reason for the composite message. In some embodiments, generating output data that defines such a description can include analyzing activity data included in a user action profile of a user account for which the composite message is being generated. The activity data can be analyzed to determine activity records having a threshold level of relevancy with respect to at least one of the first event and the second event. For example, an activity record can convey that a user made a prior purchase of a ticket for the first ticketed performance, and another activity record can convey that the user had a browsing history indicating an interest in the second ticketed performance. Thus, the first activity record and the second activity record can have a threshold level of relevancy. In response to determining that at least one activity record in the user action profile has a threshold level of relevancy with respect to one or more of the first event and the second event, the computing system can generate output data defining a description of reasons for the composite message.

In some embodiments, the computing system can generate the composite message by generating an email message, for example, having a subject line that identifies the defined action determined in block 830. See, for example, description 504, FIG. 5, or description 604, FIG. 6A. The email message can be formatted according to HTML format, for example, and can include multiple individual messages arranged in the defined layout discussed above. Presentation of the composite message at a user device (e.g., user device 140) can cause the user device to display a UI (e.g., UI 502, FIG. 5, or UI 602, FIG. 6A) corresponding to the email message. The UI includes the multiple individual messages according to such a layout.

In other embodiments, the computing system can generate the composite message by generating a webpage having a banner or another type of visual element that identifies the defined action determined in block 830. Presentation of the composite message at a user device (e.g., user device 140) can cause the user device to display a UI (e.g., UI 502, FIG. 5, or UI 602, FIG. 6A) corresponding to the webpage. The UI includes the multiple individual messages according to such a layout.

At block 850, the computing system can send the composite message at a select time to the communication address. To that end, in some embodiments, the computing system can execute the message transmission module 108 or another type of software component with similar functionality. The computing system can send the composite message to the communication address periodically. For instance, the computing system can send the composite message on a weekly basis, on a particular day of the week and at about a particular time. In one example, the composite message can be embodied in an email message having a subject line indicative of the defined action determined at block 830, and the communication address can be embodied in an email address included in the user account associated with the defined action.

Figure 9:
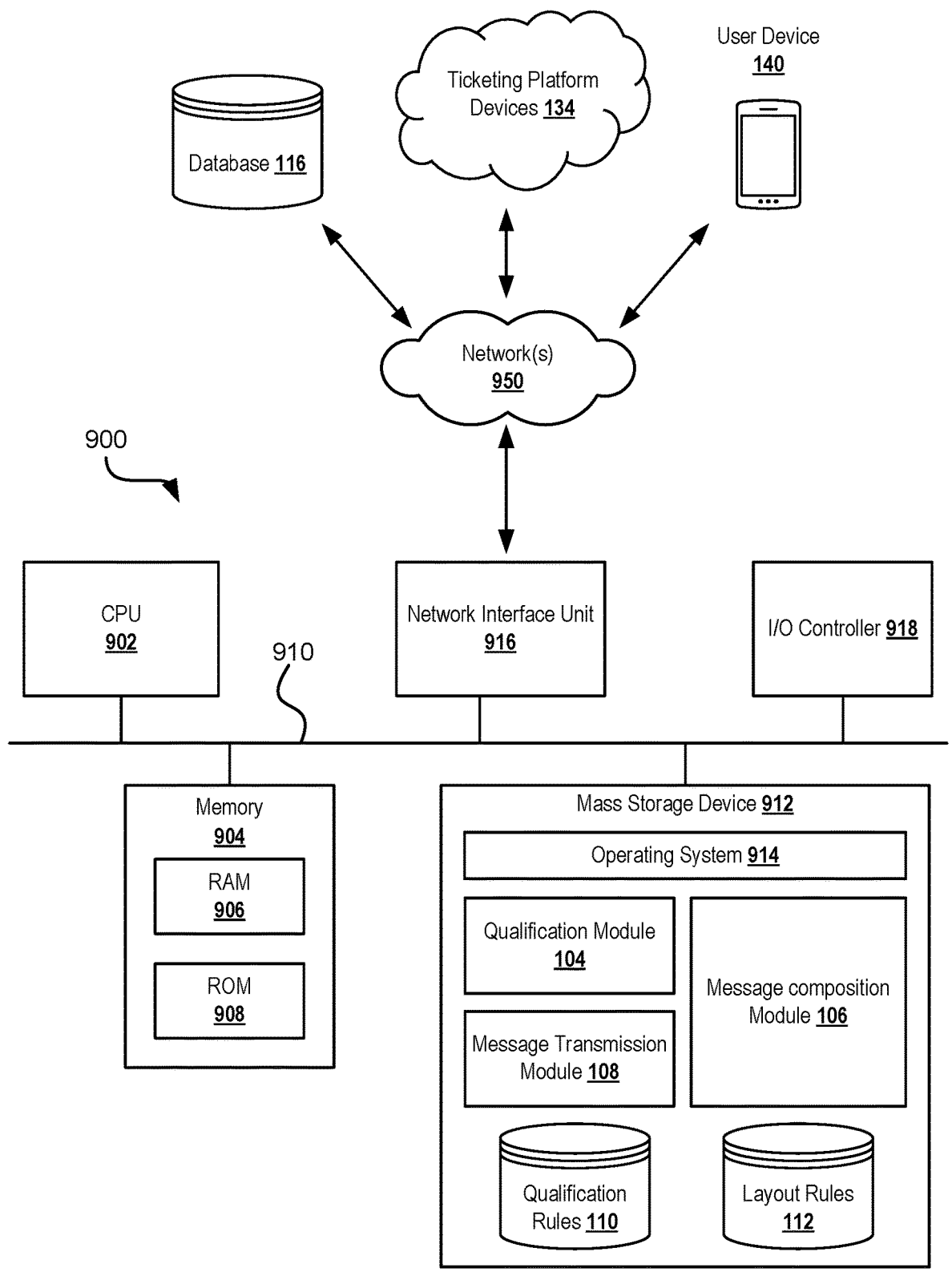
FIG. 9 illustrates an example of a computer architecture for a computing device capable of providing the functionalities of the technologies disclosed herein.

FIG. 9 illustrates additional details of an example of a computer architecture 900 for a computing device capable of providing the functionalities described herein, such as those described with reference to the messaging system 102 or any software components thereof as described herein. Thus, the computer architecture 900 illustrates an architecture for a server computer, or network of server computers, or any other types of computing devices suitable for implementing the functionality described herein. The computer architecture 900 may be utilized to execute any aspects of the software components disclosed herein.

The computer architecture 900 includes a central processing unit 902 (CPU), a system memory 904, including a random-access memory 906 (RAM) and a read-only memory (ROM) 908, and a bus 910 that couples the memory 904 to the CPU 902. A basic input/output system or another type of firmware containing the basic routines that help to transfer information between elements within the computer architecture 900, such as during startup, is stored in the ROM 908. The computer architecture 900 further includes a mass storage device 912 for storing an operating system 914, other data, and one or many application programs (not depicted in FIG. 9). As is illustrated in FIG. 9, the mass storage device 912 also can include the qualification module 104, the message composition module 106, the message transmission module 108, the qualification rules 110, and/or the layout rules 112.

The mass storage device 912 is connected to the CPU 902 through a mass storage controller (not depicted in FIG. 9) connected to the bus 910. The mass storage device 912 and its associated computer-readable media provide non-volatile storage for the computer architecture 900. Although the description of computer-readable media contained herein refers to a mass storage device, such as a solid-state drive, a hard disk, or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

As an illustration, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes of the claims, the phrase "computer storage medium," "computer-readable storage medium" and variations thereof, does not include waves, signals, and/or other transitory and/or intangible communication media, per se.

According to various techniques, the computer architecture 900 may operate in a networked environment using logical connections to remote computers through one or multiple networks 950 and/or another network (not depicted in FIG. 9). The computer architecture 900 may connect to the network(s) 950 through a network interface unit 916 connected to the bus 910. It should be appreciated that the network interface unit 916 also may be utilized to connect to other types of networks and remote computer systems. The computer architecture 900 also may include an input/output controller 918 for receiving and processing input from a number of other devices, including a keyboard, mouse, or electronic stylus (not shown in FIG. 9). Similarly, the input/output controller 618 may provide output to a display screen, a printer, or other type of output device (also not shown in FIG. 9). It should also be appreciated that via a connection to the network(s) 950 through a network interface unit 916, the computing architecture can permit or otherwise facilitate the ticketing platform devices 134, the user device 140, and/or the database 116 to communicate with one another.

It should be appreciated that the software components described herein may, when loaded into the CPU 902 and executed, transform the CPU 902 and the overall computer architecture 900 from a general-purpose computing system into a special-purpose computing system customized to facilitate the functionality presented herein. The CPU 902 may be constructed from any number of transistors or other discrete circuit elements, which may individually or collectively assume any number of states. More specifically, the CPU 902 may operate as a finite-state machine, in response to executable instructions contained within the software modules disclosed herein. These computer-executable instructions may transform the CPU 902 by specifying how the CPU 902 transitions between states, thereby transforming the transistors or other discrete hardware elements constituting the CPU 902.

Encoding the software modules disclosed herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it is noted that many types of physical transformations take place in the computer architecture 900 in order to store and execute the software components presented herein. It also is noted that the computer architecture 900 may include other types of computing devices, including hand-held computers, embedded computer systems, personal digital assistants, and other types of computing devices known to those skilled in the art.

It also is contemplated that the computer architecture 900 may not include all of the components shown in FIG. 9, may include other components that are not explicitly shown in FIG. 9, or may utilize an architecture completely different than that shown in FIG. 9. For example, the technologies disclosed herein can be utilized with multiple CPUs for improved performance through parallelization, graphics processing units (GPUs) for faster computation, and/or tensor processing units (TPUs). The term "processor" as used herein encompasses CPUs, GPUs, TPUs, and other types of processors.

CONCLUSION

In closing, as described above, the disclosed technologies permit the generation of composite messages using qualifying events corresponding to respective ticketed performances and qualifying actions of a subscriber to a ticketing platform. In this way, the disclosed technologies tangibly improve the delivery of more efficient contextually-relevant messages to subscribers as well as computing efficiencies with respect to a wide variety of computing resources that would otherwise be consumed and/or utilized absent the generation and periodic submission of such a composite message. By implementing the disclosed technologies, processing cycles are reduced because composite messages are created for respective user accounts for which the composite messages are contextually relevant, instead of creating large numbers of individual electronic messages according to ad hoc business rules that can render the individual electronic messages irrelevant for a large number of recipient subscriber accounts. Network traffic also is reduced because such composite messages are sent periodically only to particular subscribers.

Although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
receiving first data indicative of a first event, the first event indicating a change in a first parameter of a first ticketed performance;
receiving second data indicative of a second event, the second event indicating a change in a second parameter of a second ticketed performance, the second ticketed performance being a different ticketed performance than the first ticketed performance;
receiving user activity data for a user account, the user activity data indicative of a history of user activity related to one or more ticketed performances;
determining that the change in the first parameter satisfies a first qualification rule;
determining that the change in the second parameter satisfies a second qualification rule;
determining that the user activity data identifies at least one defined user action related to one or more of the first ticketed performance or the second ticketed performance;
in response to determining that the change in the first parameter satisfies the first qualification rule, determining that the change in the second parameter satisfies the second qualification rule, and determining that the user activity data identifies at least one defined user action related to one or more of the first ticketed performance or the second ticketed performance;
generating multiple individual messages corresponding to the first ticketed performance and to the second ticketed performance;
determining a placement score for each individual message based on the user activity data; and
arranging the individual messages in a layout of areas within a user interface according to a ranking of the placement scores, to form a composite message, the composite message including a reason for delivering the composite message.

2. The computer-implemented method of claim 1, wherein the first parameter comprises a price of a ticket for the first ticketed performance or a historical average of the price of the ticket for the first ticketed performance, and wherein the second parameter comprises a price of ticket for the second ticketed performance or a historical average of the price of the ticket for the second ticketed performance.

3. The computer-implemented method of claim 1, wherein generating multiple individual messages comprises:
determining a first priority score for the first event using at least the user activity data; determining a second priority score for the second event using at least the user activity data;
generating a first individual message corresponding to the first ticketed performance; and
generating a second individual message corresponding to the second ticketed performance.

4. The computer-implemented method of claim 3, wherein the first priority score is greater than the second priority score, and wherein arranging the first individual message and the second individual message comprises:
assigning the first individual message to a first area of the layout of areas using the first priority score, the first area being positioned at a first distance from an edge of the user interface; and
assigning the second individual message to a second area of the layout of areas using the second priority score, the second area being positioned at a second distance from the edge, wherein the second distance is greater than the first distance.

5. The computer-implemented method of claim 4, wherein the first priority score determines a prominence of the first area, and wherein the second priority score determines a prominence of the second area.

6. The computer-implemented method of claim 4, wherein the layout of areas includes a video area to display a video segment and an image area to display a still image, and wherein the first area is adjacent to the video area and the second area is adjacent to the image area.

7. The computer-implemented method of claim 4, wherein the first area has a first shape based on the first priority score, and wherein the second area has a second shape based on the second priority score.

8. The computer-implemented method of claim 3, wherein generating the composite message further comprises generating an email message formatted according to a hypertext markup language (HTML) format, the email message comprising the UI.

9. The method of claim 1, further comprising generating output data indicative that at least one defined user action relates to the first ticketed performance or the second ticketed performance.

10. The computer-implemented method of claim 9, wherein generating the composite message further comprises generating a webpage comprising the user interface.

11. The method of claim 1, further comprising:
determining that a first defined user action of the at least one defined user action has a threshold level of relevancy with at least one of the first event or the second event; and
generating output data that conveys the first defined user action.

12. A computer-implemented method, comprising:
determining a first event that satisfies a first qualification rule, the first event indicating a change in a first parameter of a first ticketed performance;
determining a second event that satisfies a second qualification rule, the second event indicating a change in a second parameter of a second ticketed performance, the second ticketed performance being a different ticketed performance than the first ticketed performance;
determining a user account having activity data that identifies at least one defined user action related to one or more of the first ticketed performance or the second ticketed performance;
in response to determining the first event, determining the second event, and determining the user account, generating multiple individual messages corresponding to the first ticketed performance and to the second ticketed performance;
determining a placement score for each individual message based on the activity data; and
arranging the individual messages in a layout of areas within a user interface according to a ranking of placement scores, to form a composite message, the composite message including a reason for receiving the composite message.

13. The computer-implemented method of claim 12, wherein generating multiple individual messages comprises:
generating a first individual message corresponding to the first ticketed performance; and
generating a second individual message corresponding to the second ticketed performance, wherein a first priority score in the ranking of placement scores determines a prominence of a first area, and wherein a second priority score in the ranking of placement scores determines a prominence of a second area.

14. The computer-implemented method of claim 13, wherein the first priority score is greater than the second priority score, and wherein arranging the first individual message and the second individual message comprises:
assigning the first individual message to the first area using the first priority score, the first area being positioned at a first distance from an edge of the UI; and
assigning the second individual message to the second area using the second priority score, the second area being positioned at a second distance from the edge, wherein the second distance is greater than the first distance.

15. The computer-implemented method of claim 12, wherein generating the composite message comprises generating output data that conveys a first defined user action of the at least one defined user action.

16. The computer-implemented method of claim 12, wherein the determining the first event comprises sending a query representative of the first qualification rule to a database, and wherein the determining the second event comprises sending a query representative of the second qualification rule to the database, and further wherein the determining the user account comprises sending a query representative of the at least one defined user action to the database.

17. A system, comprising:
one or more processors; and
a memory in communication with the one or more processors, the memory having computer-executable instructions stored thereupon that, when executed by the one or more processors, cause the one or more processors to:
determine a first event that satisfies a first qualification rule, the first event indicating a change in a first parameter of a first ticketed performance;
determine a second event that satisfies a second qualification rule, the second event indicating a change in a second parameter of a second ticketed performance, the second ticketed performance being a different ticketed performance than the first ticketed performance;
determine a user account having user activity data that identifies at least one defined user action related to one or more of the first ticketed performance or the second ticketed performance;
in response to determining the first event, determining the second event, and determining the user account, generate multiple individual messages corresponding to the first ticketed performance and to the second ticketed performance;
determine a placement score for each individual message based on the user activity data; and
arrange the individual messages in a layout of areas within a user interface according to a ranking of the placement scores, to form a composite message indicative of the first ticketed performance and the second ticketed performance, the composite message providing a description of a reason for delivering the composite message.

18. The system of claim 17, wherein generate multiple individual messages, the one or more processors further execute instructions to:
generate a first individual message corresponding to the first ticketed performance; and
generate a second individual message corresponding to the second ticketed performance.

19. The system of claim 18, wherein generating the composite message further comprises generating an email message formatted according to a hypertext markup language (HTML) format, the email message comprising the user interface and having a subject line including the description, and wherein the computer executable instructions further cause the one or more processors to send the email message at a select time to an email address corresponding to the user account.

20. The system of claim 17, wherein the computer-executable instructions further cause the one or more processors to generate output data defining the description, wherein the description conveys a first defined user action of the at least one defined user action.

\* \* \* \* \*

UNITED STATES PATENT AND TRADEMARK OFFICE
CERTIFICATE OF CORRECTION

PATENT NO. : 11,223,596 B2
APPLICATION NO. : 16/409752
DATED : January 11, 2022
INVENTOR(S) : Klucznik et al.

It is certified that error appears in the above-identified patent and that said Letters Patent is hereby corrected as shown below:

In the Specification

At Column 10, Line 17: Please delete "13" before "...reason-code pair. Specifically, the messaging composition..."

Signed and Sealed this
Twelfth Day of July, 2022

Katherine Kelly Vidal
*Director of the United States Patent and Trademark Office*